United States Patent
Dooley

(10) Patent No.: US 7,312,550 B2
(45) Date of Patent: Dec. 25, 2007

(54) ARCHITECTURE FOR ELECTRIC MACHINE

(75) Inventor: Kevin Allan Dooley, Mississauga (CA)

(73) Assignee: Pratt & Whitney Canada Corp., Longueuil, Québec (CA)

(*) Notice: Subject to any disclaimer, the term of this patent is extended or adjusted under 35 U.S.C. 154(b) by 0 days.

(21) Appl. No.: 11/531,854

(22) Filed: Sep. 14, 2006

(65) Prior Publication Data

US 2007/0024249 A1   Feb. 1, 2007

Related U.S. Application Data

(60) Continuation of application No. 11/159,290, filed on Jun. 23, 2005, now Pat. No. 7,126,313, which is a division of application No. 10/444,952, filed on May 27, 2003, now Pat. No. 6,965,183.

(51) Int. Cl.
  *H02K 17/00* (2006.01)
  *H02K 3/04* (2006.01)
  *H02K 3/00* (2006.01)
  *H02K 1/00* (2006.01)

(52) U.S. Cl. ............ 310/201; 310/112; 310/114; 310/179; 310/180; 310/207; 310/208

(58) Field of Classification Search ......... 310/112, 310/114, 179–180, 201, 207–208
See application file for complete search history.

(56) References Cited

U.S. PATENT DOCUMENTS

| | | | |
|---|---|---|---|
| 2,564,320 A | 8/1951 | Brainard | 322/28 |
| 2,713,128 A * | 7/1955 | Toffolo | 310/180 |
| 2,886,762 A | 5/1959 | Polasek | 322/24 |
| 3,590,351 A | 6/1971 | Littwin | 318/759 |
| 3,633,083 A | 1/1972 | Teodorescu | 318/767 |
| 3,707,638 A | 12/1972 | Nailen | 310/152 |
| 3,753,068 A | 8/1973 | Walker, Jr. | 388/803 |
| 3,763,413 A | 10/1973 | Wattenbarger | 318/799 |
| 3,812,441 A | 5/1974 | Sakamoto et al. | 335/208 |
| 3,961,211 A | 6/1976 | Vergues | 310/68 C |
| 4,004,202 A | 1/1977 | Davis | 318/138 |

(Continued)

FOREIGN PATENT DOCUMENTS

DE   3430590 A1   2/1986

(Continued)

OTHER PUBLICATIONS

General Electric Company, "150Kva Samarium Cobalt VSCF Starter/Generator Electrical System, Final Technical Report", 1979.

(Continued)

*Primary Examiner*—Darren Schuberg
*Assistant Examiner*—Pedro J. Cuevas
(74) *Attorney, Agent, or Firm*—Ogilvy Renault LLP

(57) ABSTRACT

In one aspect, an alternator is described which includes a current control apparatus including a stator winding and a control winding, wherein current control in the control winding regulates the stator winding. In another aspect, a gas turbine engine includes a multiple-channel alternator for redundantly driving accessory systems. In another aspect, an alternator cooling scheme is provided, which alternator includes means for reducing stray inductance of stator winding end turns.

23 Claims, 29 Drawing Sheets

U.S. PATENT DOCUMENTS

| | | | |
|---|---|---|---|
| 4,019,104 A | 4/1977 | Parker | 318/832 |
| 4,032,807 A | 6/1977 | Richter | 310/178 |
| 4,039,910 A | 8/1977 | Chirgwin | 318/807 |
| 4,237,395 A | 12/1980 | Loudermilk | 310/113 |
| 4,250,128 A | 2/1981 | Meckling | 264/429 |
| 4,346,335 A | 8/1982 | McInnis | 388/803 |
| 4,392,072 A | 7/1983 | Rosenberry | 310/216 |
| 4,401,906 A | 8/1983 | Isobe et al. | 310/156.08 |
| 4,445,061 A | 4/1984 | Jackson, Jr. | 310/156.08 |
| 4,492,902 A | 1/1985 | Ficken et al. | 318/254 |
| 4,503,377 A | 3/1985 | Kitabayashi et al. | 318/807 |
| 4,511,831 A | 4/1985 | McInnis | 388/803 |
| 4,547,713 A | 10/1985 | Langley et al. | 318/254 |
| 4,562,399 A | 12/1985 | Fisher | 322/94 |
| 4,605,874 A | 8/1986 | Whiteley | 310/268 |
| 4,617,726 A | 10/1986 | Denk | 29/598 |
| 4,625,135 A | 11/1986 | Kasabian | 310/156.28 |
| 4,638,201 A | 1/1987 | Feigel | 310/216 |
| 4,678,881 A | 7/1987 | Griffith | 219/631 |
| 4,709,180 A | 11/1987 | Denk | 310/216 |
| 4,713,570 A | 12/1987 | Mastromattei | 310/181 |
| 4,758,753 A | 7/1988 | Murakami | 310/72 |
| 4,763,034 A | 8/1988 | Gamble | 310/181 |
| 4,764,698 A | 8/1988 | Murakami | 310/72 |
| 4,799,578 A | 1/1989 | Matsushita | 192/84.961 |
| 4,852,245 A | 8/1989 | Denk | 29/596 |
| 4,887,020 A | 12/1989 | Graham | 322/63 |
| 4,896,756 A | 1/1990 | Matsushita | 192/84.961 |
| 4,897,570 A | 1/1990 | Ishikawa et al. | 310/154.17 |
| 4,924,125 A | 5/1990 | Clark | 310/67 R |
| 5,030,877 A | 7/1991 | Denk | 290/52 |
| 5,059,876 A | 10/1991 | Shah | 318/254 |
| 5,097,140 A * | 3/1992 | Crall | 290/36 R |
| 5,117,144 A | 5/1992 | Török | 310/269 |
| 5,184,040 A | 2/1993 | Lim | 310/114 |
| 5,235,231 A | 8/1993 | Hisey | 310/259 |
| 5,245,238 A | 9/1993 | Lynch et al. | 310/116 |
| 5,254,894 A | 10/1993 | Satake et al. | 310/114 |
| 5,260,642 A | 11/1993 | Huss | 322/51 |
| 5,274,291 A | 12/1993 | Clarke | 310/112 |
| 5,304,883 A | 4/1994 | Denk | 310/180 |
| 5,397,948 A | 3/1995 | Zoerner et al. | 310/46 |
| 5,519,275 A | 5/1996 | Scott et al. | 310/112 |
| 5,541,463 A * | 7/1996 | Ellzey, Jr. | 310/261 |
| 5,555,722 A | 9/1996 | Mehr-Ayin et al. | 60/788 |
| 5,585,682 A | 12/1996 | Konicek et al. | 310/89 |
| 5,742,106 A | 4/1998 | Muraji | 310/36 |
| 5,770,901 A | 6/1998 | Niimi et al. | 310/52 |
| 5,793,137 A | 8/1998 | Smith | 310/114 |
| 5,798,596 A | 8/1998 | Lordo | 310/261 |
| 5,822,150 A | 10/1998 | Kelsic | 360/98.07 |
| 5,825,597 A | 10/1998 | Young | 361/31 |
| 5,834,874 A | 11/1998 | Krueger et al. | 310/191 |
| 5,838,080 A | 11/1998 | Couderchon et al. | 310/49 R |
| 5,903,115 A | 5/1999 | Taylor | 318/34 |
| 5,912,522 A * | 6/1999 | Rivera | 310/184 |
| 5,917,248 A | 6/1999 | Seguchi et al. | 290/31 |
| 5,925,999 A | 7/1999 | Lakerdas et al. | 318/496 |
| 5,936,325 A | 8/1999 | Permuy | 310/162 |
| 5,942,829 A | 8/1999 | Huynh | 310/178 |
| 5,952,757 A | 9/1999 | Boyd, Jr. | 310/156.81 |
| 5,953,491 A | 9/1999 | Sears et al. | 388/811 |
| 5,955,809 A | 9/1999 | Shah | 310/198 |
| 5,962,938 A | 10/1999 | Bobay et al. | 310/67 R |
| 6,011,338 A | 1/2000 | Bell et al. | 310/184 |
| 6,097,124 A | 8/2000 | Rao et al. | 310/156.26 |
| 6,097,127 A * | 8/2000 | Rivera | 310/184 |
| 6,100,620 A | 8/2000 | Radovsky | 310/268 |
| 6,114,784 A | 9/2000 | Nakano | 310/59 |
| 6,239,532 B1 | 5/2001 | Hollenbeck et al. | 310/257 |
| 6,242,840 B1 | 6/2001 | Denk et al. | 310/254 |
| 6,255,756 B1 | 7/2001 | Richter | 310/208 |
| 6,271,613 B1 | 8/2001 | Akemakou et al. | 310/181 |
| 6,286,199 B1 | 9/2001 | Bobay et al. | 29/596 |
| 6,313,560 B1 | 11/2001 | Dooley | 310/259 |
| 6,323,625 B1 | 11/2001 | Bhargava | 322/32 |
| 6,326,713 B1 | 12/2001 | Judson | 310/112 |
| 6,342,746 B1 | 1/2002 | Flynn | 310/181 |
| 6,373,162 B1 | 4/2002 | Liang et al. | 310/156.53 |
| 6,429,615 B1 | 8/2002 | Schmider et al. | 318/254 |
| 6,437,529 B1 | 8/2002 | Brown | 318/439 |
| 6,504,261 B2 | 1/2003 | Fogarty et al. | 290/52 |
| 6,525,504 B1 | 2/2003 | Nygren et al. | 318/700 |
| 6,541,887 B2 | 4/2003 | Kawamura | 310/190 |
| 6,566,784 B1 | 5/2003 | Hsu | 310/254 |
| 6,713,888 B2 * | 3/2004 | Kajiura | 290/40 F |
| 6,717,318 B1 | 4/2004 | Mathiassen | 310/216 |
| 6,801,421 B1 * | 10/2004 | Sasse et al. | 361/268 |
| 6,920,023 B2 | 7/2005 | Dooley | 361/23 |
| 6,936,948 B2 | 8/2005 | Bell et al. | 310/201 |
| 6,965,183 B2 | 11/2005 | Dooley | 310/201 |
| 7,030,582 B2 | 4/2006 | Masino | 318/439 |
| 7,061,149 B2 * | 6/2006 | Crane | 310/71 |
| 7,126,313 B2 * | 10/2006 | Dooley | 322/44 |
| 2002/0047455 A1 | 4/2002 | Dhyanchand et al. | 310/211 |
| 2002/0084705 A1 | 7/2002 | Kawamura | 310/68 R |
| 2002/0084712 A1 | 7/2002 | Hyun | 310/179 |
| 2002/0084715 A1 | 7/2002 | Kakuta et al. | 310/216 |
| 2002/0093252 A1 | 7/2002 | Kang et al. | 310/12 |
| 2002/0149281 A1 | 10/2002 | Saint-Michel et al. | 310/179 |
| 2003/0178896 A1 * | 9/2003 | Crane | 310/68 R |
| 2004/0239202 A1 * | 12/2004 | Dooley | 310/184 |
| 2004/0239203 A1 * | 12/2004 | Bell et al. | 310/184 |
| 2005/0242785 A1 * | 11/2005 | Dooley | 322/44 |
| 2006/0113967 A1 * | 6/2006 | Dooley | 322/57 |
| 2006/0226721 A1 * | 10/2006 | Dooley et al. | 310/113 |
| 2006/0244332 A1 * | 11/2006 | Wyremba | 310/179 |

FOREIGN PATENT DOCUMENTS

| | | |
|---|---|---|
| EP | 368930 B1 | 4/1994 |
| EP | 754365 B1 | 2/1998 |
| EP | 750806 B1 | 8/1998 |
| EP | 1 235 327 A2 | 8/2002 |
| EP | 1 235 327 A3 | 8/2002 |
| FR | 1555855 | 12/1968 |
| FR | 2618616 | 7/1987 |
| GB | 2 184 609 A | 6/1987 |
| JP | 1-138936 | 5/1989 |
| JP | 1-138938 | 5/1989 |
| JP | 6 237 561 | 8/1994 |
| JP | 7 039122 | 2/1995 |
| JP | 7 075213 | 3/1995 |
| JP | 9 205743 | 8/1997 |
| JP | 2000-102232 | 4/2000 |
| JP | 2001-16887 | 1/2001 |
| JP | 2002-191158 | 7/2002 |
| JP | 2002-291216 | 10/2002 |
| JP | 2003-102159 | 4/2003 |
| WO | WO 90/10971 | 9/1990 |
| WO | 99/09638 | 2/1999 |
| WO | 99/66624 | 12/1999 |
| WO | 02/09260 A1 | 1/2002 |
| WO | 03/003546 A1 | 1/2003 |
| WO | WO 03/023939 A1 | 3/2003 |
| WO | 03/028202 A1 | 4/2003 |

OTHER PUBLICATIONS

M. Cronin, "The All-Electric Airplane as Energy Efficient Transport", SAE Journal, 1980.

Richter, E. et al., "Jet Engine Integrated Generator", Amcn Inst. Aeronautics & Astronautics, 1981.

B. Dishner et al., "A Novel Electromechanical Approach to Constant Frequency Power Generation", IEEE Journal, 1989.

M. Cronin, "The All-Electric Airplane Revisited", SAE Technical Series, 1989.

SAE Technical Paper Series 892252, Application Considerations for Integral Gas Turbine Electric Starter/Generator revisited. 1989.

The Applicability of Electrically Driven Accessories for Turboshaft Engines, 1993.

R. Nims, "Development of an Oilless, Gearless, and Bleedable under Armour Power Unit", ASME paper, 1995.

Richter et al., "Preliminary Design of an Internal Starter/Generator for Aplication in the F110-129 Engine", SAE Aerospace Atlantic Conference, 1995.

R. Nims, "Armor-plated auxiliary power", Mechanical Enginering, 1997.

PCT International Search Report for International application No. PCT/CA2004/000689 mailed Sep. 16, 2004.

English version (translation) of the German patent DE 3430590 A1 cited in the Information Disclosure Statement filed on Sep. 27, 2004.

* cited by examiner

ARCHITECTURE FOR ELECTRIC MACHINE

CROSS-REFERENCE TO RELATED U.S. APPLICATION

The present application is a continuation of U.S. patent application Ser. No. 11/159,290 filed Jun. 23, 2005, now U.S. Pat. No. 7,126,313 which is a divisional of U.S. patent application Ser. No. 10/444,952 filed May 27, 2003, now U.S. Pat. No. 6,965,183, all of which are hereby incorporated by reference.

TECHNICAL FIELD

The invention relates to electric machines such as alternators and motors and, more particularly, to a novel architecture for such machines.

BACKGROUND OF THE ART

Referring to FIG. 1, a typical permanent magnet (PM) machine according to the prior art is shown at 100. Prior art PM machine 100 has a rotor 102, with permanent magnets 104 mounted thereto by a retaining ring 106, which is mounted on a rotatable shaft 108. Rotor 102 is adjacent a stator 110 having a plurality of windings 112 interspersed between a plurality of teeth 114 mounted to a back iron 116. (For ease of illustration, the adjacent elements of windings 112 in FIG. 1b are shown unconnected.) As is well understood, PM machine 100 may operate in a generator/alternator mode or a motor mode. When operated in a generator/alternator mode, an external torque source forces rotation of the shaft (and thus the rotor and the magnets), and the interaction of the magnets and the windings causes a magnetic flux to loop the windings in the slots. As the rotor rotates, the magnetic flux in the stator structure changes, and this changing flux results in generation of voltage in the windings, which results in an output current that can be used to power electrical devices, or be stored for later use. When operated in a motor mode, a voltage from an external source is applied to the stator windings which causes current flow in the windings and results in a magnetic flux to be set up in the magnetic circuit formed by the teeth and back iron. When current is supplied in an appropriate manner to the windings, the rotor can be made to rotate and thus produce usable torque. The operation of such machines is thus well understood.

Such PM machines can have an "inside rotor" configuration as shown in FIGS. 1a and 1b, or an "outside rotor" configuration as shown in FIGS. 2a and 2b. The reference numerals in FIGS. 2a and 2b correspond to the corresponding features described with reference to FIGS. 1a and 1b. In the "outside rotor" configuration, however, rotor yoke 108' replaces rotor shaft 108. For ease of illustration, the adjacent elements of the windings in FIG. 2b are also shown unconnected.

Irrespective of whether operated in an alternator or motor mode, the magnetic flux path in these prior art PM machines is as partially and simply depicted in FIG. 3, the flux path as indicated by the arrows 118, and the poles and virtual poles denoted by an "N" or an "S". It is this magnetic flux 118 which induces a voltage in the alternator winding 112 (or in the case of a motor, creates the magnetic attraction with the permanent magnet 106 to cause rotor rotation), as described above.

Prior art PM machines (and particularly PM alternators) suffer from at least two limitations which has limited their usefulness somewhat, namely: (1) the output of the PM alternator may only be controlled within the machine (i.e. varied) by varying the rotor speed (assuming a fixed geometry machine), and (2) if a short circuit or other internal fault occurs in the machine, the internal fault current can become extremely destructive to the machine, particularly in high power applications. With reference to the first drawback, this intrinsic feature particularly limits the usefulness of a PM generator in circumstances where the rotor rotation speed cannot be independently controlled. It would therefore be desirable to improve the controllability of PM machines, generally.

PM machines offer certain attractive advantages for use in high speed applications, and particularly as an integrated starter-generator (ISG) for a propulsive or prime-mover gas turbine engine, in which the PM machine is mounted directly to a turbine shaft of the engine. This shaft, of course, is driven at whatever speed is required for the running of the gas turbine engine (typically anywhere in the range of 0-50,000 rpm) and thus the shaft speed cannot be varied to suit the controllability limitations of the PM machine, but rather is dictated by the mechanical output requirements of the engine. Therefore, although the ISG designer will know the average steady state speed of the turbine shaft at cruise, can thus design an PM alternator system to provide sufficient electrical output necessary to power the aircraft systems at cruise (where the engine typically spends most of its operation cycle), accommodations must be made for take-off (where the turbine shaft may be turning at twice cruise speed, doubling alternator output) and landing approach (where turbine shaft speed may half of cruise speed, halving alternator output). The problem is an order of magnitude greater for certain military applications, where cruise speed is rarely maintained for any length of time. The prior art therefore poses optimization problems to the ISG designer, where critical over-power and under-power scenarios must be managed to achieve a satisfactory design.

There are other drawbacks inherent prior art designs, which result in complicated mechanisms and fabrication techniques. U.S. Pat. No. 6,525,504 to Nygren et al. shows one example of a relatively complicated solution to the control of certain aspects of the operation of a PM machine used in high voltage power generator applications. The device offers only limited control over operation of the machine, and its complexity makes it unsuitable for higher reliability and lighter weight applications such as, for example, aircraft applications.

Accordingly, there is a need to provide an improved PM machine which addresses these and other limitations of the prior art, and it is an object of this invention to do so.

SUMMARY OF THE INVENTION

In one aspect, the present invention provides an alternator comprising a rotor; a stator; at least one stator winding for providing an alternating current to a load electrical circuit, the stator winding having a plurality of serially-connected first and second portions, the first portions spaced apart circumferentially from one another relative to the stator; a control electrical circuit including at least one control winding and a control apparatus for controlling current flow through the control winding, the control winding having a plurality of legs, one of said legs disposed adjacent to each second portion of the stator winding; a plurality of rotor magnetic flux paths defined co-operatively by the rotor and stator for conducting rotor magnetic flux around the plurality of first portions of the stator winding; and a plurality of secondary magnetic flux paths for conducting secondary magnetic flux induced by current flow through the stator winding, the secondary magnetic flux paths defined around the stator winding second portions and adjacent control winding legs, the secondary magnetic flux paths being isolated from the rotor and the rotor magnetic flux paths.

In another aspect, the present invention provides a gas turbine engine system comprising an electric machine operable at least as an alternator, the alternator having a stator with independently-controllable non-overlapping stator sectors defined therein, each stator sector having stator windings operable independently of other stator windings of the machine, each sector connected to its own power conditioning system, the sectors connected in parallel to a gas turbine engine accessory system.

In a further aspect, the present invention provides an alternator comprising a rotor, a stator having at least one stator winding having a plurality of end turns exposed at an axial end of the stator, a fluid cooling jacket substantially surrounding the stator and the end turns, and an insert disposed intermediate the end turns and the cooling jacket, the cooling jacket communicating with a fluid coolant supply, the insert having jets for directing fluid coolant from the cooling jacket to the end turns, the insert comprised of at least one of copper and aluminium to thereby reduce stray inductance of the end turns.

Still other inventions are disclosed in this specification and attached figures, as well.

BRIEF DESCRIPTION OF THE DRAWINGS

For a better understanding of the present invention and to show more clearly how it may be carried into effect, reference will now be made by way of example to the accompanying drawings, showing articles made according to preferred embodiments of the present invention, in which:

FIG. 1b is an exploded isometric view of the prior art device of FIG. 1a;

FIG. 2b is an exploded isometric view of the prior art device of FIG. 2a;

FIG. 4b is an exploded isometric view of the device of FIG. 4a;

FIG. 4c is a rear isometric view of a portion (i.e. a few adjacent loops) of the primary winding of the device of FIG. 4a;

FIG. 4d is an isometric view of the secondary winding of the device of FIG. 4a;

FIG. 6b is an isometric view of the stator of the device of FIG. 6a;

FIG. 7b is much-enlarged cross-section of a portion of a stator showing the windings of FIG. 7a;

FIG. 8b is an enlarged isometric view and a cross-sectional view similar to FIG. 8a, respectively, schematically representing electrical and magnetic activity immediately after the moment in time represented in FIG. 8a;

FIG. 9 is a schematic of an equivalent electrical circuit of one phase the device of FIG. 6a;

FIG. 13b is an enlarged isometric cross-sectional view of a portion of the stator of an alternate design for the embodiment of FIG. 13a;

DESCRIPTION OF THE PREFERRED EMBODIMENTS

Figure 1A:
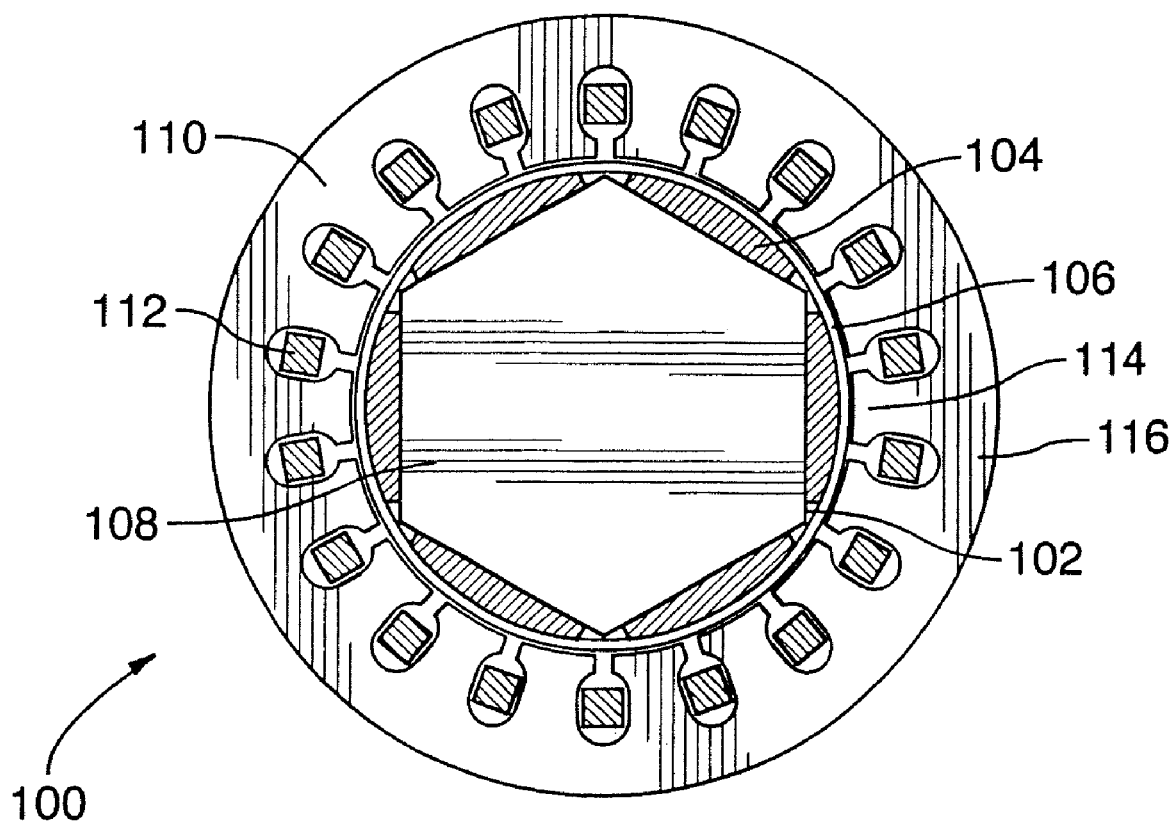
FIG. 1a is a cross-sectional view of a typical permanent magnet (PM) machine according to the prior art.
Figure 1B:
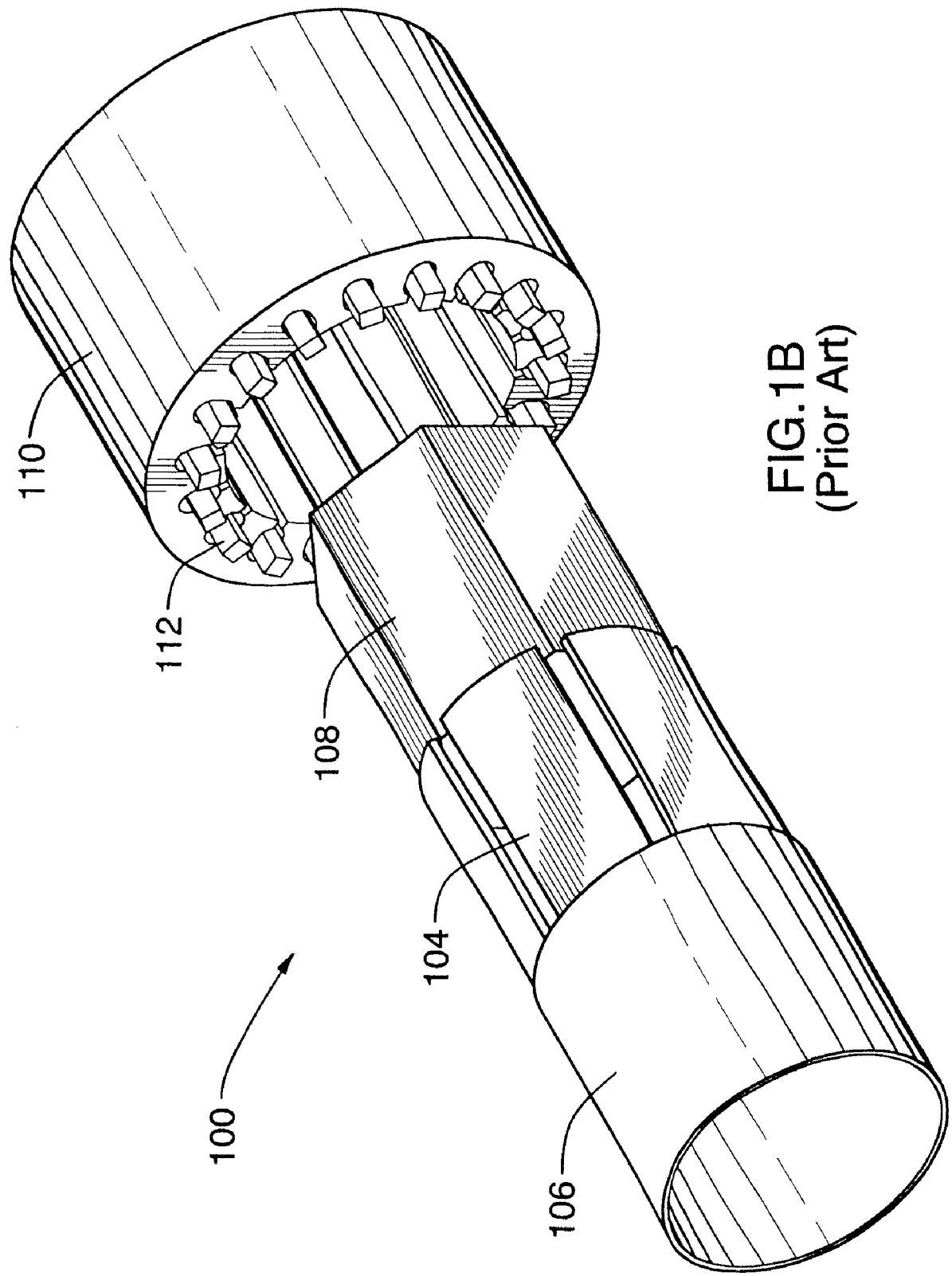
Figure 2A:
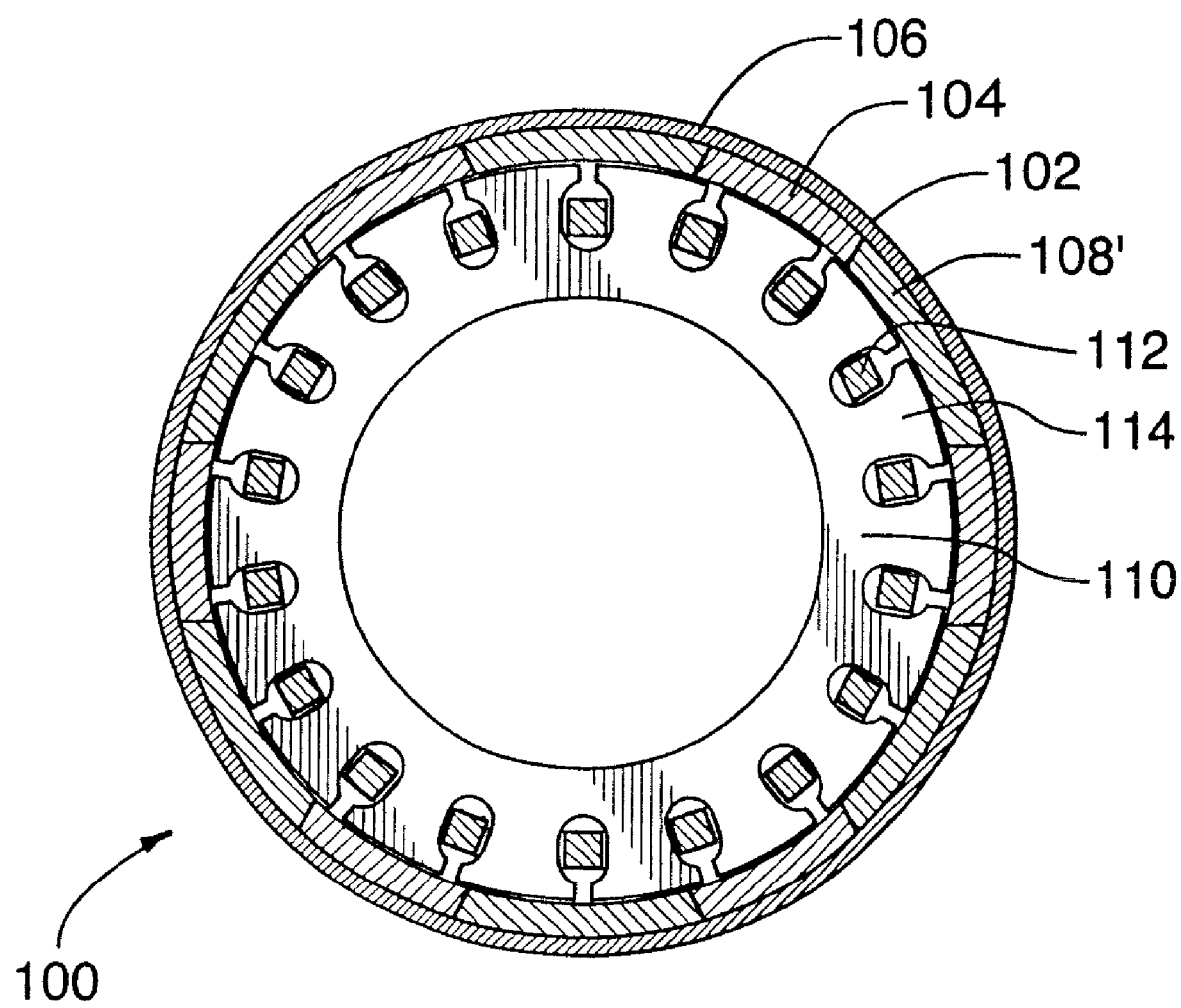
FIG. 2a is a cross-sectional view of a typical PM machine according to the prior art having an "outside rotor" configuration.
Figure 2B:
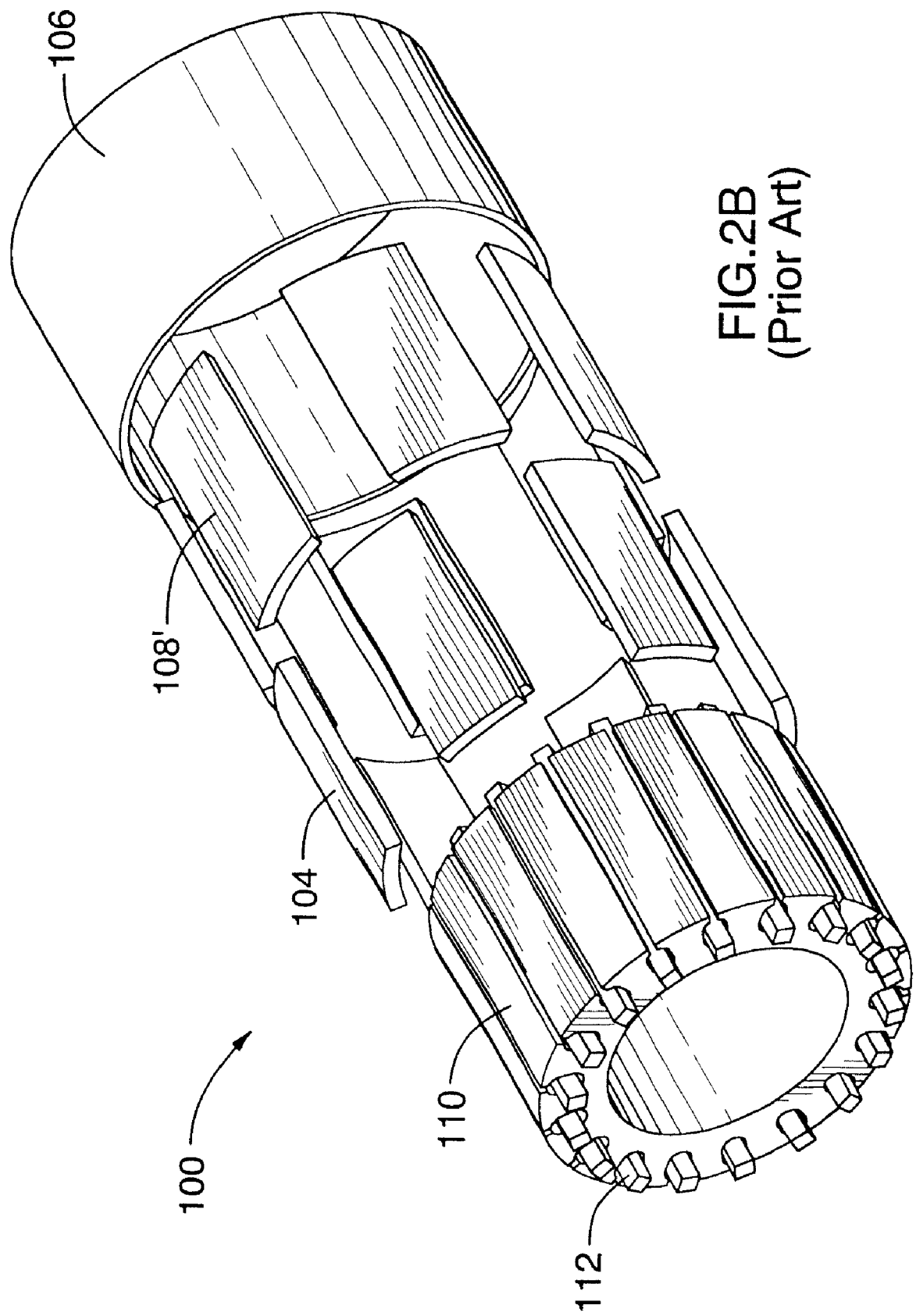
Figure 3:
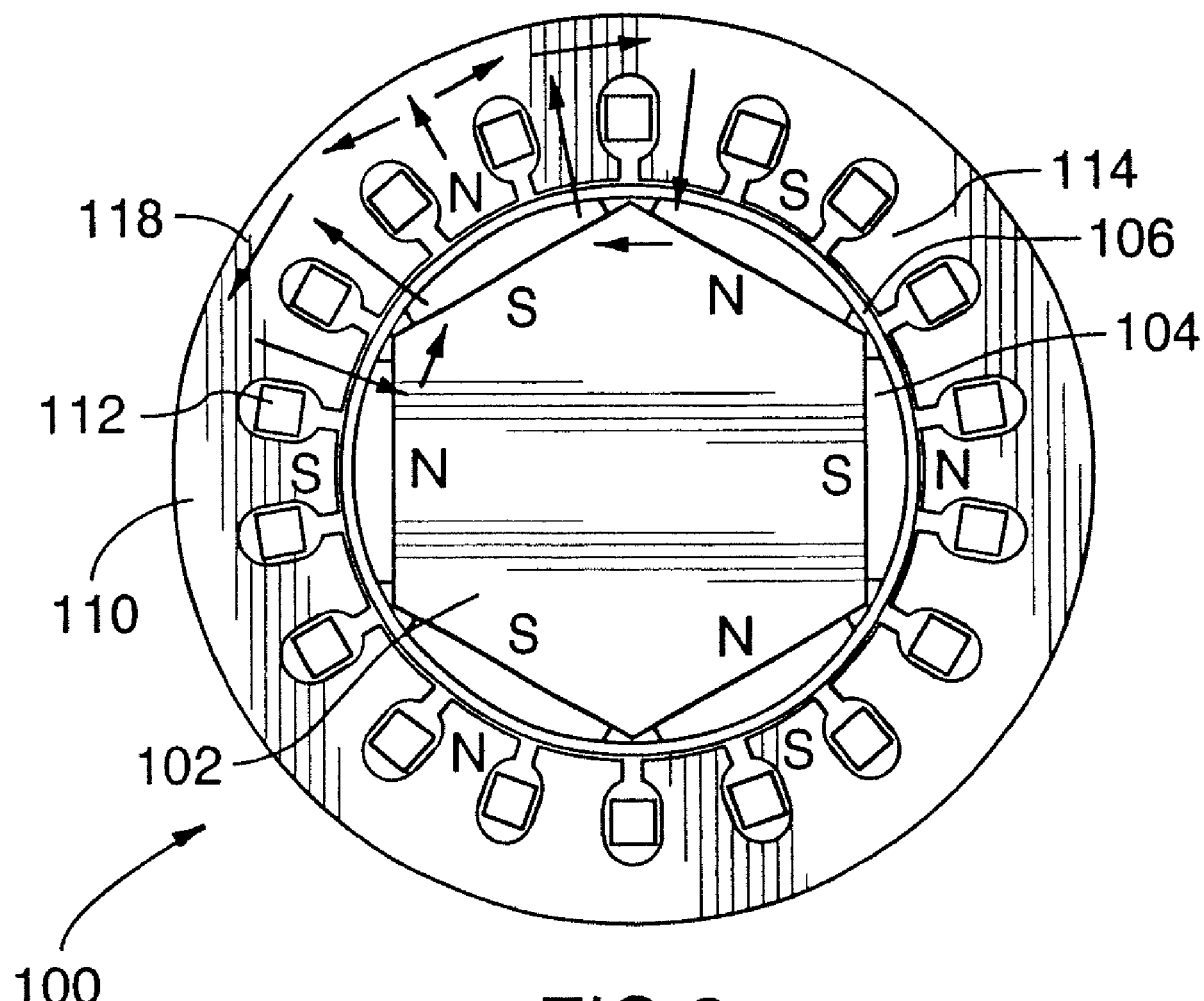
FIG. 3 is a cross-sectional view similar to FIG. 1a, schematically showing magnetic flux paths.
Figure 4A:
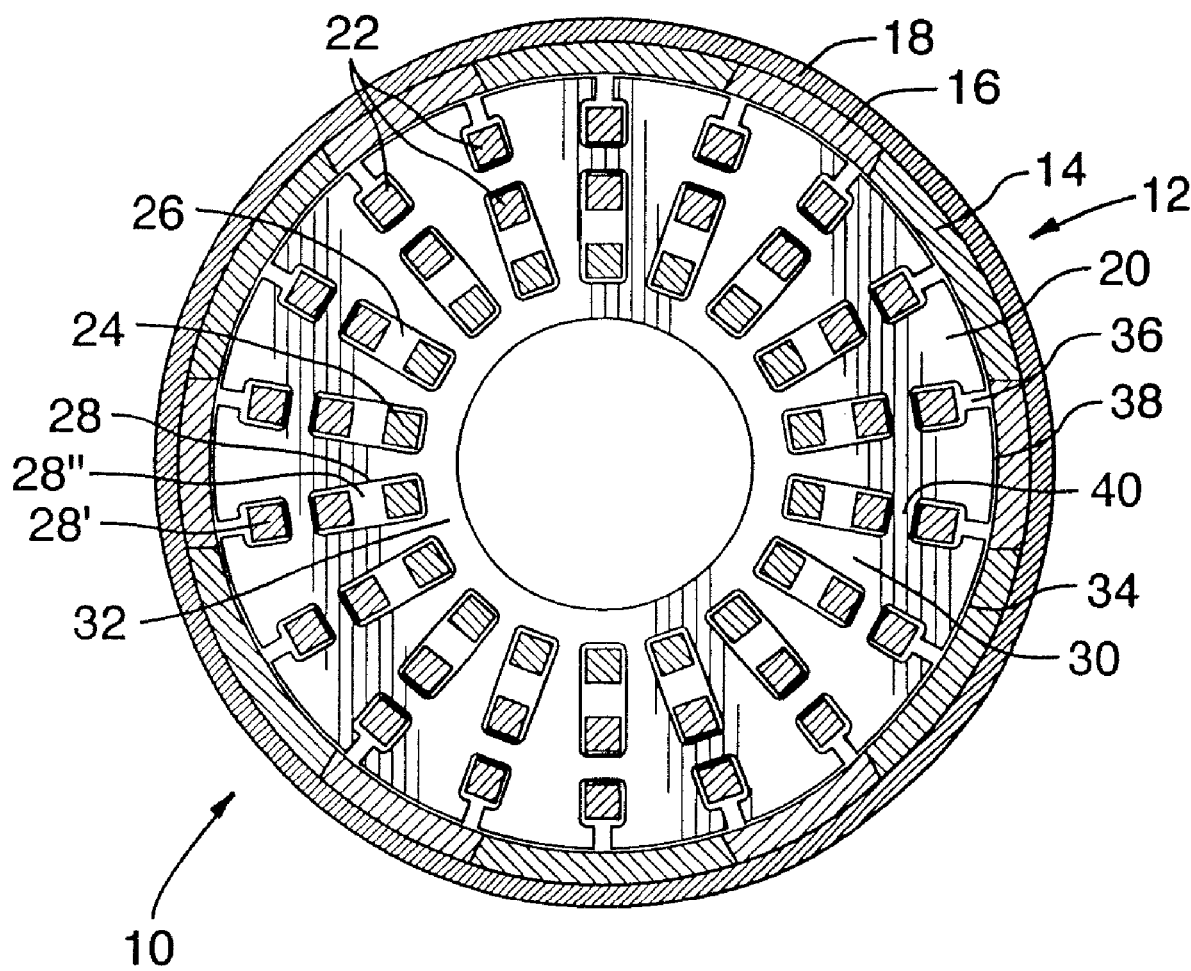
FIG. 4a is a cross-sectional view of a PM machine according to the present invention.
Figure 4B:
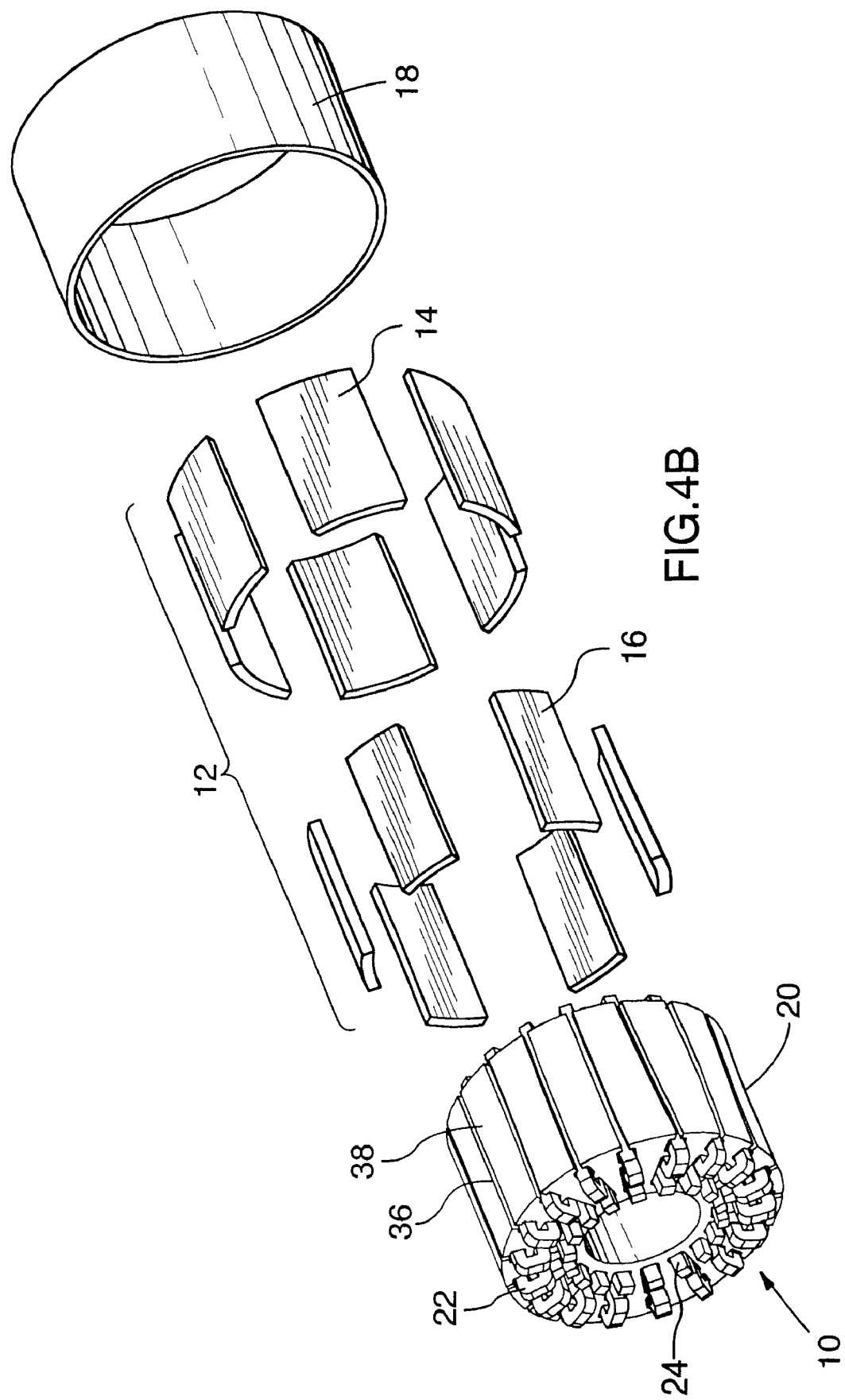

A permanent magnet (PM) machine according to the present invention is depicted in at 10 in FIGS. 4a to 4e. Referring first to FIGS. 4a and 4b, PM machine 10 has a rotor 12 which includes a plurality of permanent magnets 14 retained by a yoke 16 and retention sleeve portion 18. Machine 10 also has a stator 20 which includes at least a primary winding 22 and at least a secondary winding 24 (for clarity, only one of each such winding is shown), separated in this embodiment by a winding air gap 26 and disposed in radial slots 28 between a plurality of adjacent teeth 30 in a back iron 32. (For ease of illustration in FIG. 4b, the adjacent elements of secondary winding 24 are shown unconnected.) The winding air gap serves as insulation and may be replaced by other suitable insulation. A rotor air gap 34 separates rotor 12 and stator 20 in a typical fashion, and a stator tooth gap 36 separates adjacent teeth 30 at a rotor interface surface 38 of stator 20. Primary winding 22 and secondary winding 24 are thus electrically isolated from one another. Stator 20 also includes a core or "bridge" portion 40 bridging adjacent pairs of teeth 30 and passing between adjacent portions of primary winding 22, as will be described in more detail below.

The materials for PM machine 10 may be any deemed suitable by the designer. Materials preferred by the inventor are: samarium cobalt permanent magnets, maraging steel (preferably 250 or 300) retention sleeve, aluminum yoke, copper primary and secondary windings, a suitable electromagnetic material for the stator teeth and for the back iron.

Figure 4C:
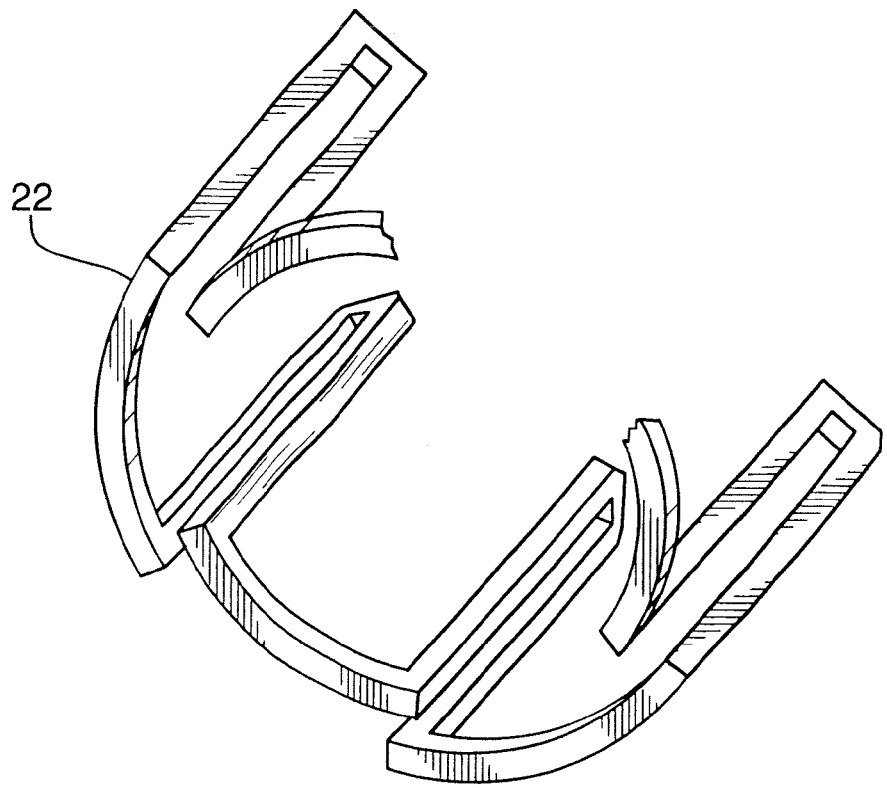
Figure 4D:
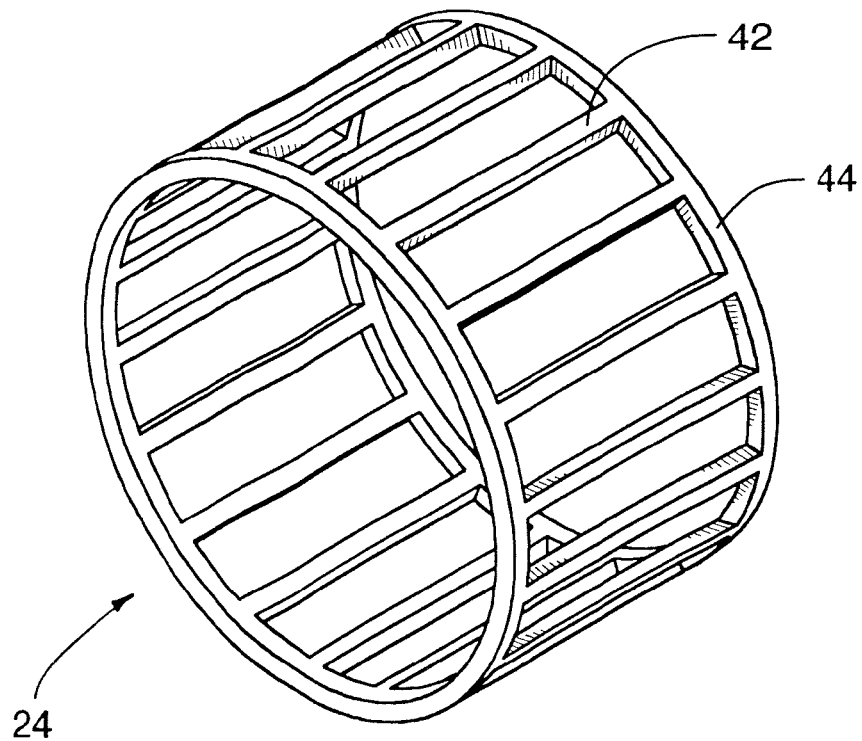
Figure 4E:
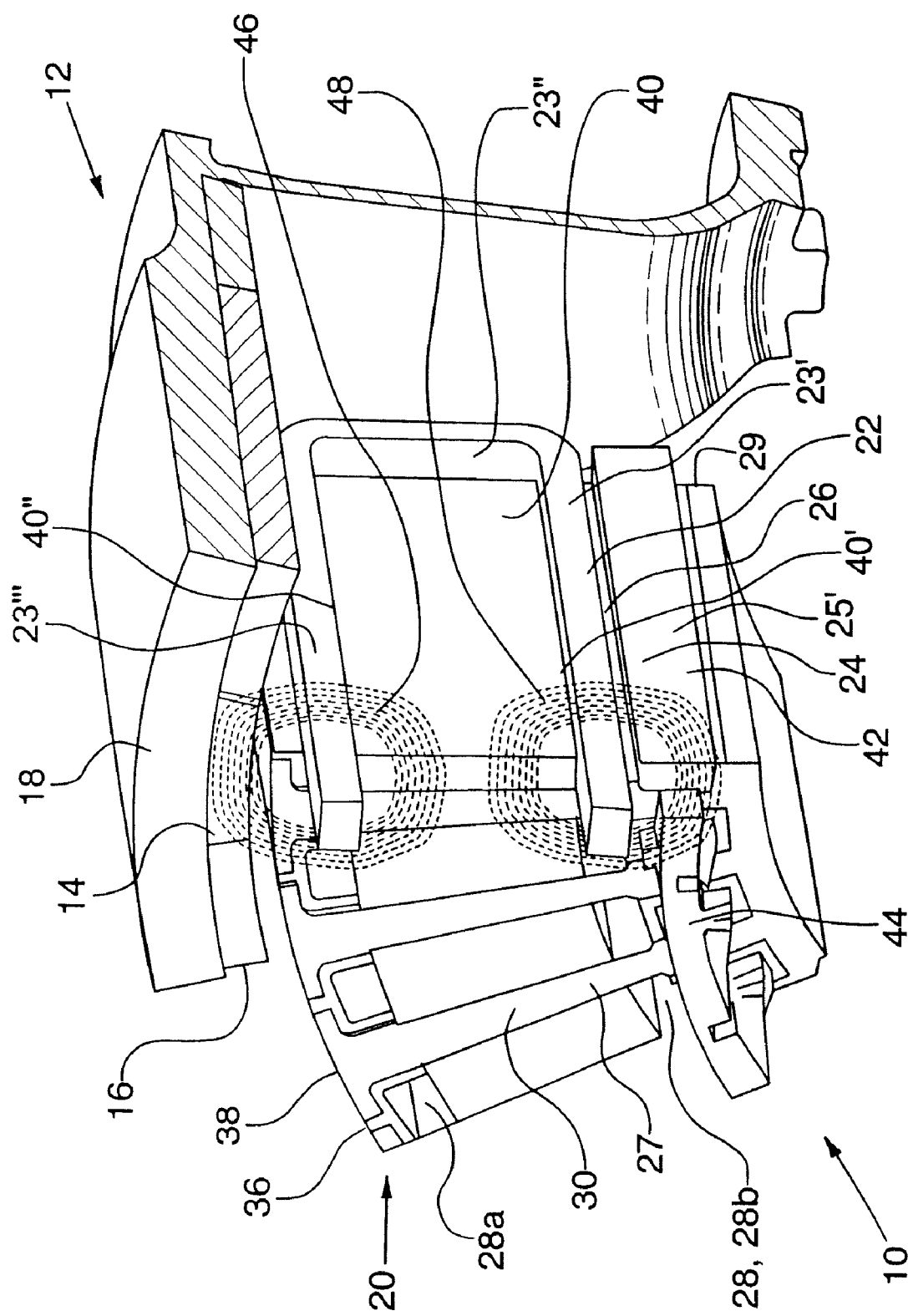
FIG. 4e is an enlarged isometric view of a portion of the rotor and stator of the device of FIG. 4a, with a portion broken away to reveal detail therein and schematically showing some magnetic flux paths in the device.

Referring to FIGS. 4c and 4e, primary winding 22 of the embodiment of FIG. 4a consists of a conductor which enters a first end 27 of a slot 28a on a first side 40' of bridge 40, and a first leg portion 23' of winding 22 travels down slot 28a, an end turn portion 23" of winding 22 crosses bridge 40 at the second (i.e. other) end 29 of slot 28a and a second leg portion 23''' travels back along slot 28a and exits slot 28a from the first end 27, but on a second side 40" of bridge 40 (i.e. opposite to the first side 40' the winding entered). Primary winding 22 then continues along the first end 27 of the stator to the next appropriate slot 28b and again enters from the first end 27 of slot 28b, but preferably from the second side 40" of bridge 40 (i.e. the same side of bridge 40 as it exited the last slot 28a). Primary winding 22 then travels down slot 28b, loops around bridge 40 at the second end 29 of slot 28b, then proceeds back up slot 28b and exits the first end 27 of slot 28b, and is now again on the first side 40' the bridge piece, and so on. Primary winding 22 is thus positioned in the desired slots 28 in stator 20. This particular pattern both facilitates assembly (as will be discussed further below) and provides an orderly arrangement for primary winding 22, and also beneficially assists winding separation within PM machine 10 (see FIG. 7b).

Referring to FIG. 4d, secondary winding 24 in the embodiment of FIGS. 4a-4e is a shorted winding to provide a squirrel cage configuration. Secondary winding 24 thus has a plurality of legs 42 extending between end rings 44.

Referring to FIG. 4e, a close-up partial isometric section shows the relative arrangements of primary winding 22 and secondary winding 24 (only a portion of one primary winding 22 is shown for clarity). In operation, as will be described in greater detail below, the interaction of magnets 14 and windings 22, and windings 22 and 24, creates magnetic flux within PM machine 10. Referring to FIG. 4e, a primary magnetic flux path or magnetic circuit 46 and a secondary magnetic flux path or magnet circuit 48 are set up within PM machine 10, as are represented schematically in FIG. 4e. The secondary magnetic flux path is isolated from the rotor and rotor magnetic circuit.

Primary magnetic circuit 46 includes rotor 12, rotor air gap 24, bridge 40 and the portion of stator teeth 30 between rotor 12 and bridge 40. Primary magnetic circuit encircles primary winding 22 and, in use (as described further below) either causes or is caused by a current flow in primary winding 22, depending on whether machine 10 is operated as an alternator/generator or motor, respectively. Secondary magnetic circuit 48 includes bridge 40, back iron 32 and the portion of stator teeth 30 between back iron 32 and bridge 40. Secondary magnetic circuit encircles secondary winding 24. Secondary winding 24, as will be described further below, is provided for control purposes and preferably, therefore, not connected to an output circuit of machine 10.

Referring again to FIG. 4a, stator 20, bridge 40 and slot 28 together define two slots or openings 28' and 28", with one opening 28' for the primary winding only, and another opening 28" for the primary and secondary windings. The primary magnetic circuit encircles opening 28' while the secondary magnetic circuit encircles opening 28". In FIG. 4a, the opening 28' is radially closer to the rotor than the other opening 28". Within the slot 28, bridge 40 extends a portion of the distance from the radially innermost portion of slot 28 to the radially outermost portion of slot 28 to thereby define openings 28' and 28". The designer will select the size of the bridge, as well as the rest of the stator dimensions, based at least in part on the desired properties of the magnetic circuits in the machine to yield the desired machine performance, etc. Referring to FIG. 4e, bridge 40 also preferably extends the entire distance from stator faces 27 to 29 and thus is adjacent the primary winding 22 along the length of legs 22a and 22c. Leg 23' is preferably substantially parallel to winding 24 along its leg 25' extending the length of opening 28".

Figure 5A:
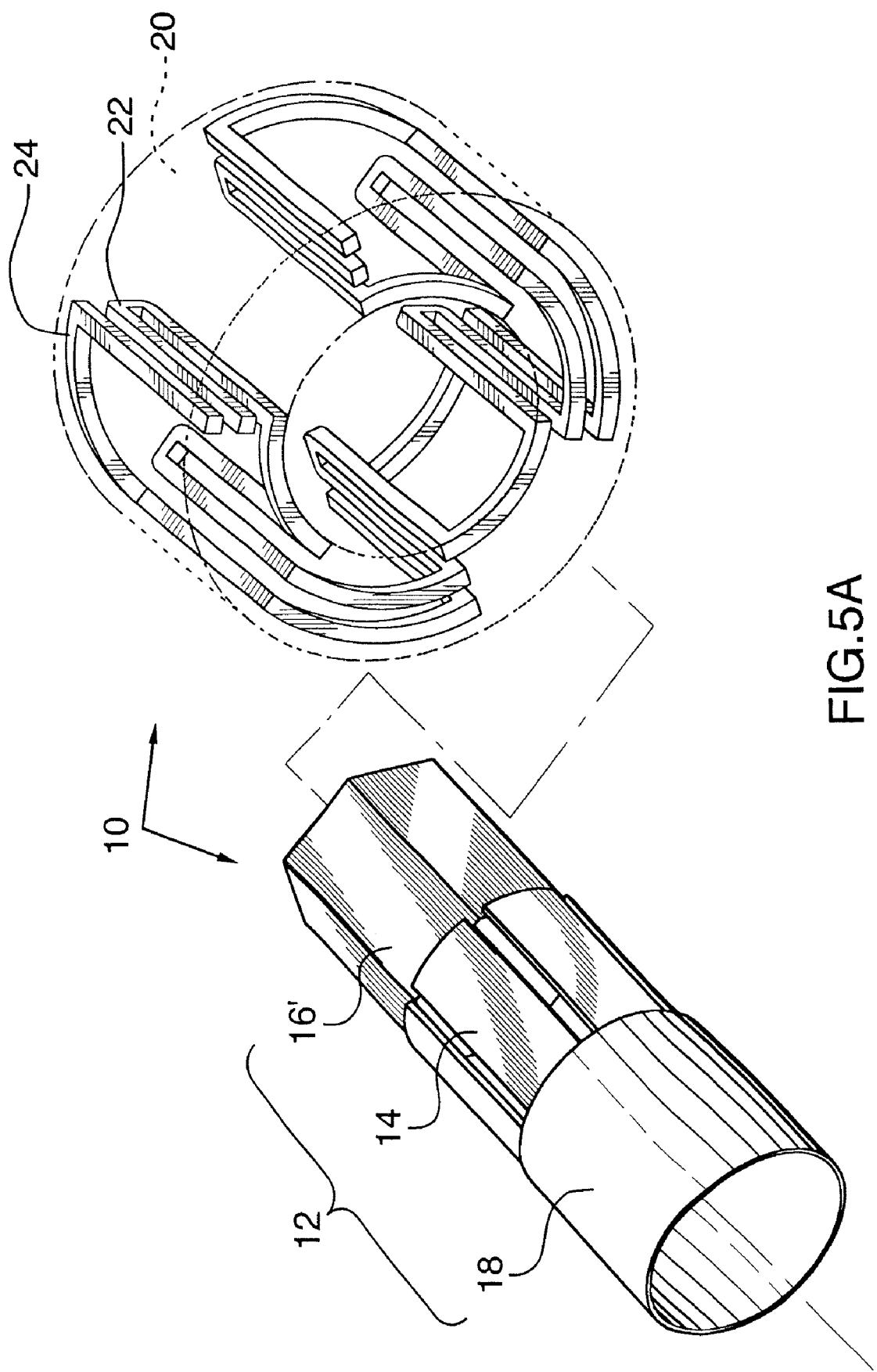
FIG. 5a is an exploded isometric view of a second embodiment of a PM machine according to the present invention, with the stator shown in ghost lines to reveal the winding detail therein.
Figure 5B:
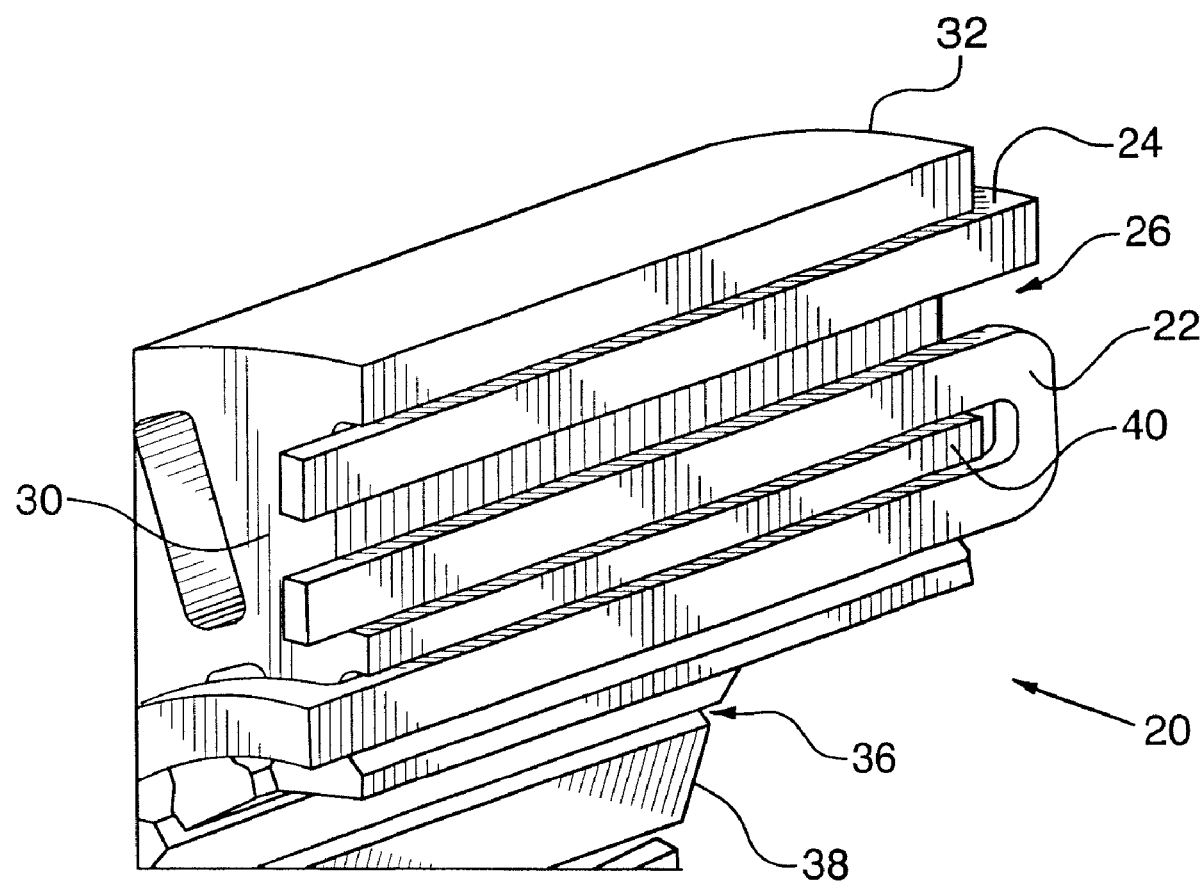
FIG. 5b is an enlarged isometric view of a portion of the stator of the device of FIG. 5a, with a portion broken away to reveal detail therein.
Figure 5C:
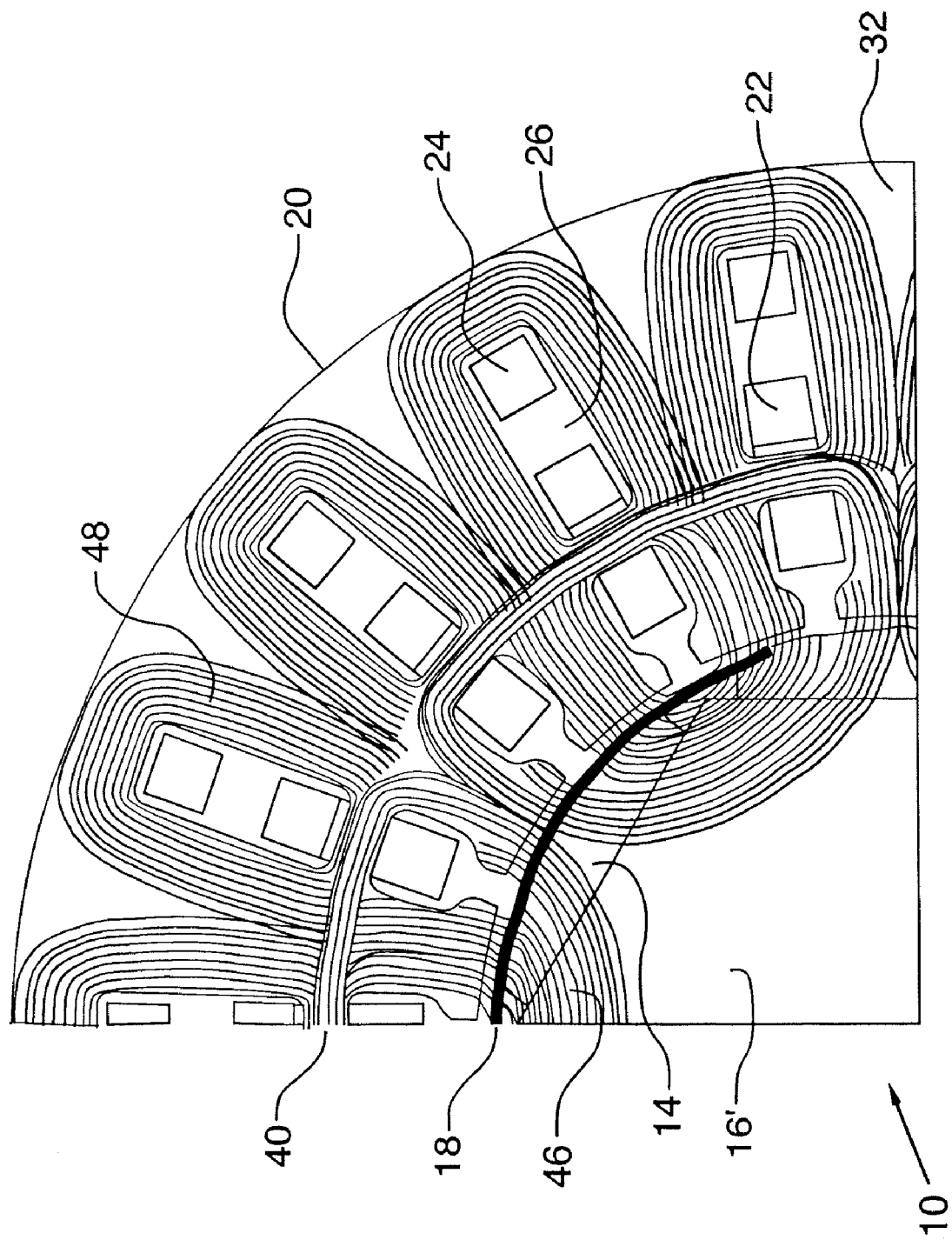
FIG. 5c is an enlarged cross-sectional partial view of the device of FIG. 5a, schematically showing magnetic flux paths in the device.

Referring to FIGS. 5a-5c, a second "inside rotor" embodiment of the present invention is shown. The same reference numerals are used to denote the analogous elements described with reference to FIGS. 4a-4d. The skilled reader will also appreciate the relative similarities and differences in construction and operation of typical "outside" vs. "inside" rotor configurations, and thus these will not be discussed further here. Aspects of the second embodiment not specifically described below may otherwise be assumed to be made in accordance with the description of the analogous element described above.

Referring to FIGS. 5a and 5b, the second embodiment of the present invention is another multi-winding, multi-phase configuration. In other words, there are multiple primary windings 22 and secondary windings 24, preferably one for each phase. For clarity, only one phase is depicted. Though only the windings of one phase will be described below, preferably the description will apply to the windings of all phases.

Referring first to FIG. 5a, each phase of primary winding 22 consists of a conductor which, in a manner similar to that described above, enters a first end 27 of a slot 28a on a first side 40' of bridge 40, travels down slot 28a, crosses bridge 40 at the second (i.e. other) end 29 of slot 28a and travels back along slot 28a and exits slot 28a from the first end 27, but on a second side 40" of bridge 40 (i.e. opposite to the first side the winding entered). Primary winding 22 then continues along the first end 27 of the stator to the next appropriate slot 28b and again enters from the first end 27 of slot 28b, but preferably from the second side 40" of bridge 40 (i.e. the same side of bridge 40 as it exited the last slot 28a). Primary winding 22 then travels down slot 28b, loops around bridge 40 at the second end 29 of slot 28b, then proceeds back up slot 28b and exits the first end 27 of slot 28b, and is now again on the first side 40' the bridge piece, and so on. Primary winding 22 is thus positioned in the desired slots 28 in stator 20.

In this embodiment, each phase of secondary winding 24 consists of a conductor which enters one end 27 of the slot 28a occupied by the primary winding 22 of that phase and then exits slot 28s from the opposite end 29 and continues to the next appropriate slot 28b (preferably the next slot occupied by this phase of primary winding 22, as depicted in FIG. 5a), and so on.

Referring to FIG. 5b, the relative arrangements of primary winding 22, secondary winding 24 and bridge 40 can be seen within stator 20. Referring to FIG. 5c, a schematic representation of the primary and secondary magnetic circuits flux paths 46 and 48, respectively, is shown when PM machine 10 is in use.

Figure 6A:
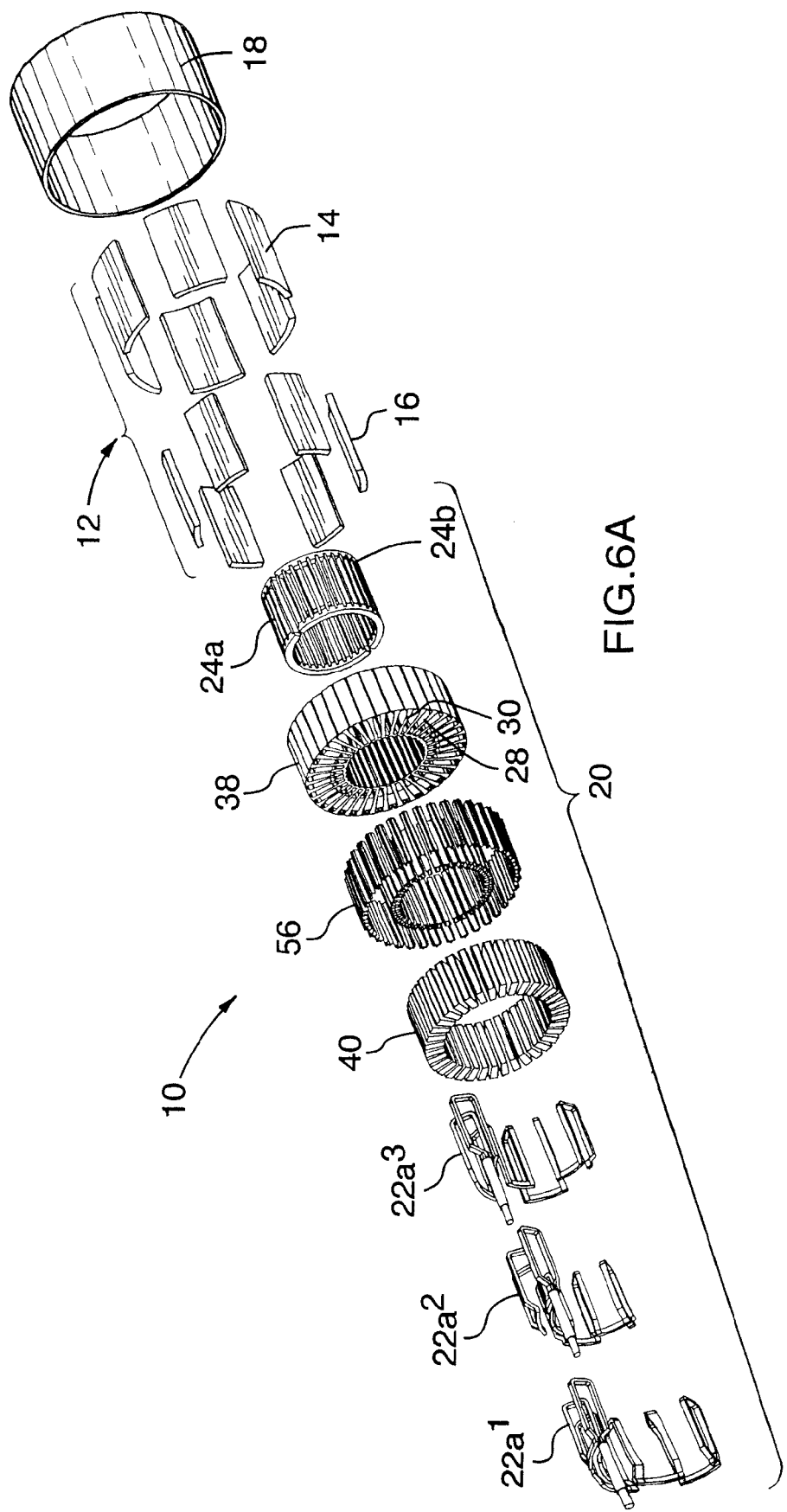
FIG. 6a is an exploded isometric view of a third embodiment of a PM machine according to the present invention.
Figure 6B:
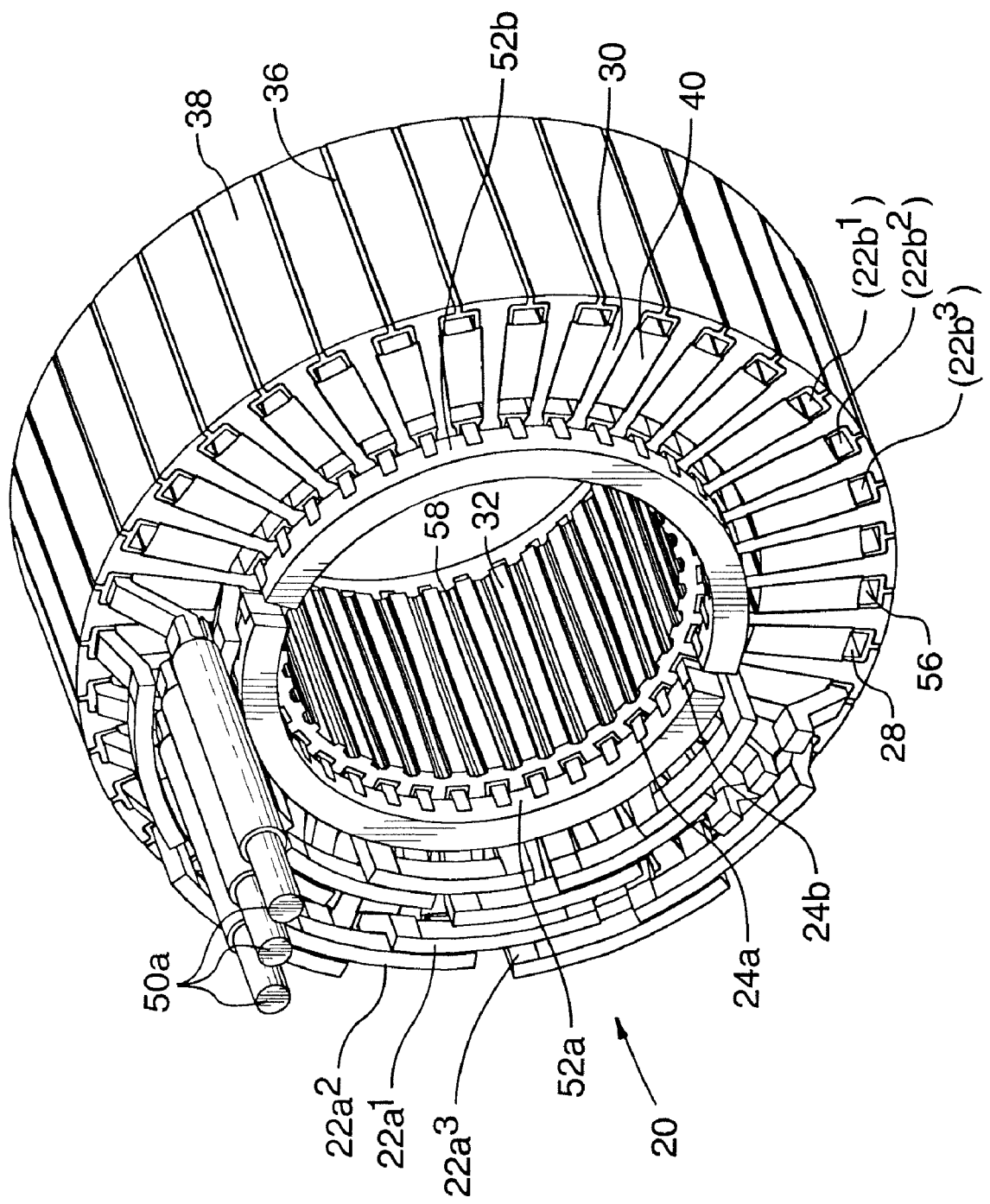
Figure 6C:
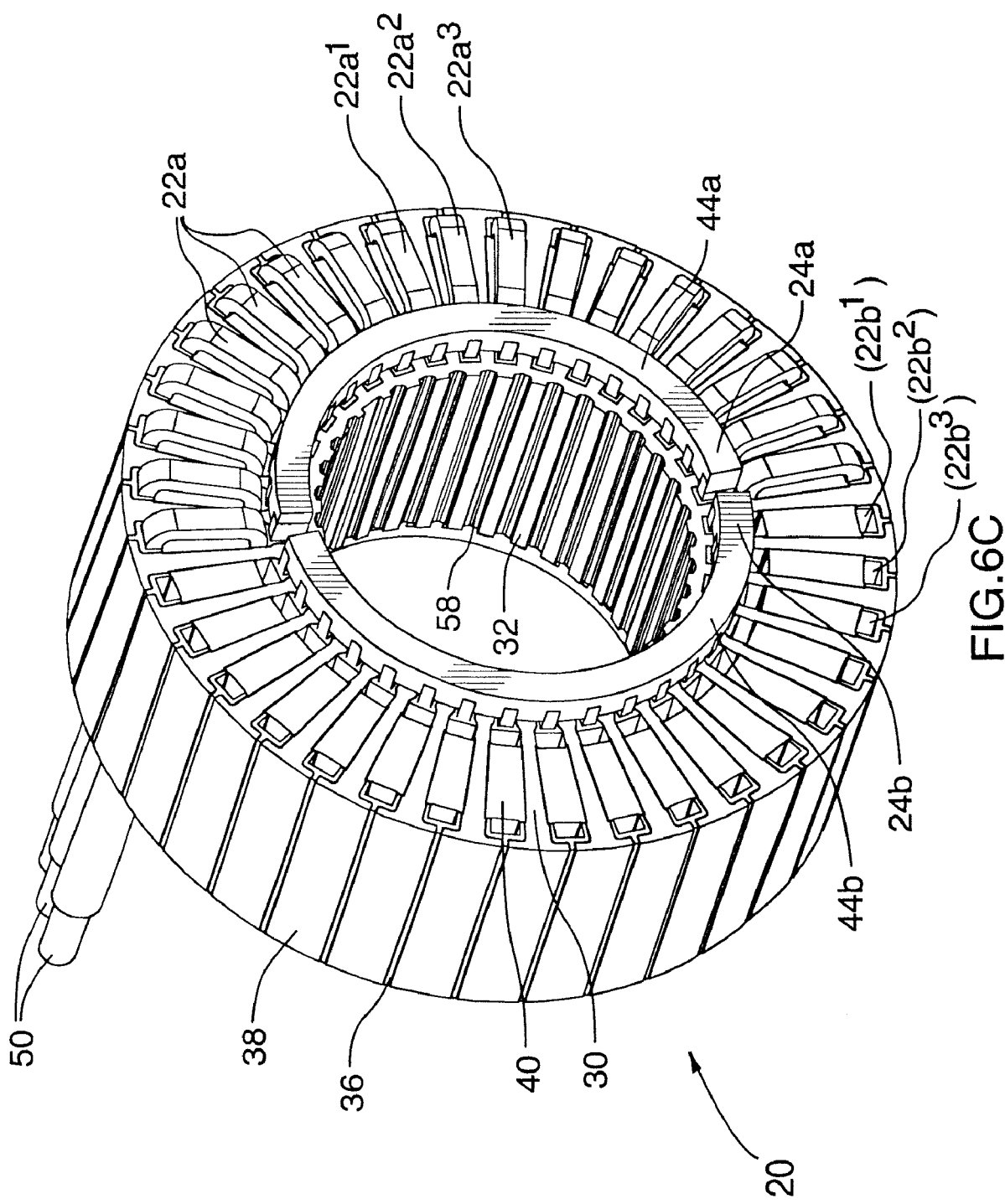
FIG. 6c is a rear isometric view of the stator of FIG. 6b.

A third embodiment of the present invention is disclosed in FIGS. 6a-6f. Referring first to FIGS. 6a & 6c, this embodiment is an outside-rotor, 3-phase, dual "channel" PM machine, depicted with one set (i.e. "channel") of primary windings 22 absent (for clarity), as will be described in more detail below. The same reference numerals are used in FIGS. 6a-6f to denote the analogous elements described with reference to the embodiments above, and thus these elements will not be redundantly described here but rather addressed only as required. Aspects of the third embodiment which are not specifically described below may be assumed therefore to be otherwise made in accordance with the description of the analogous elements above.

As mentioned briefly above, and for reasons which will become more apparent below, in this embodiment, stator 20 of PM machine 10 is conceptually divided into an "a" half and a "b" half, and thus windings 22 and 24 will be described in terms of primary windings "22a" and "22b" and secondary windings "24a" and "24b". Other features associated with windings 22 and 24 may also be described as "a" or "b" specific. Primary windings 22b are not depicted in FIGS. 6a-6c for clarity, but may be assumed to be otherwise identical to primary windings 22a.

Figure 6D:
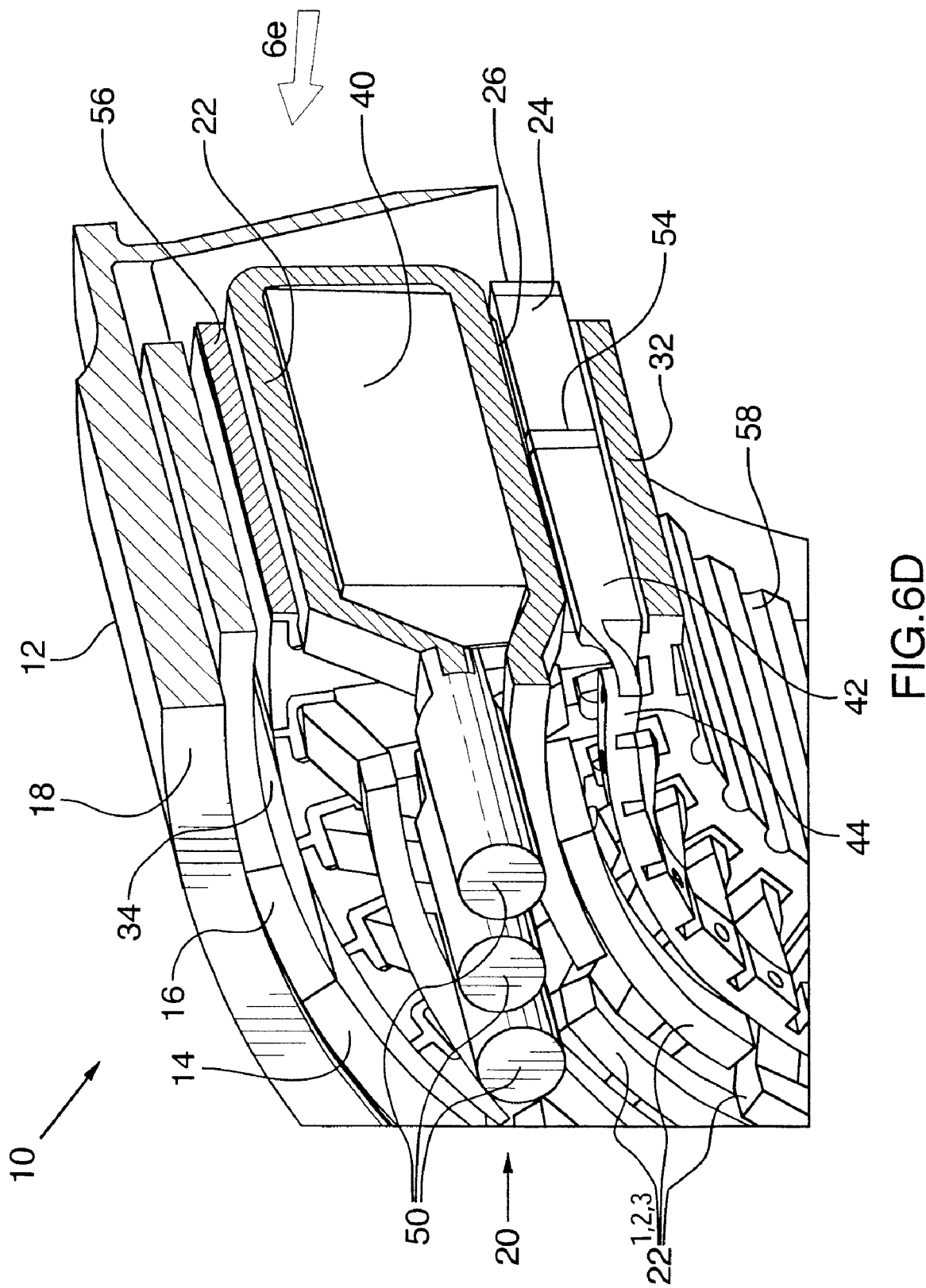
FIG. 6d is an enlarged isometric view of a portion of the rotor and stator of the device of FIG. 6a, with a portion broken away to reveal detail therein.
Figure 6E:
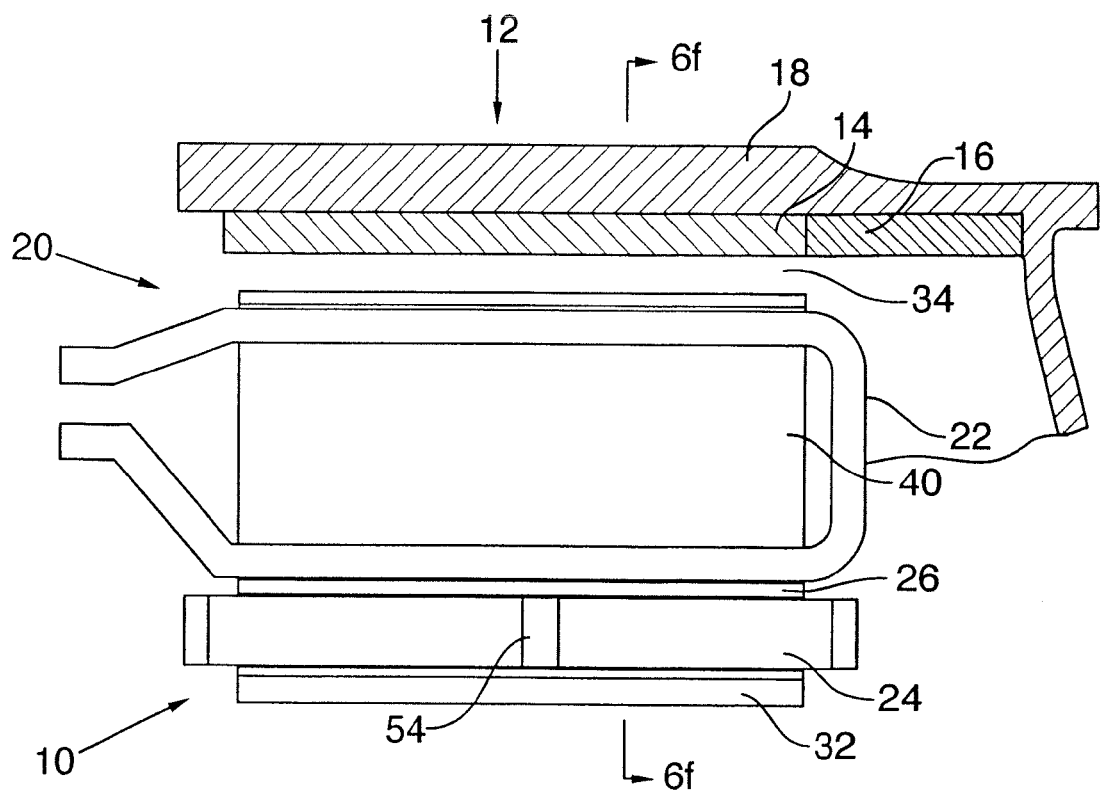
FIG. 6e is a partial cross-sectional view of the portion of the rotor and stator shown in FIG. 6d.
Figure 6F:
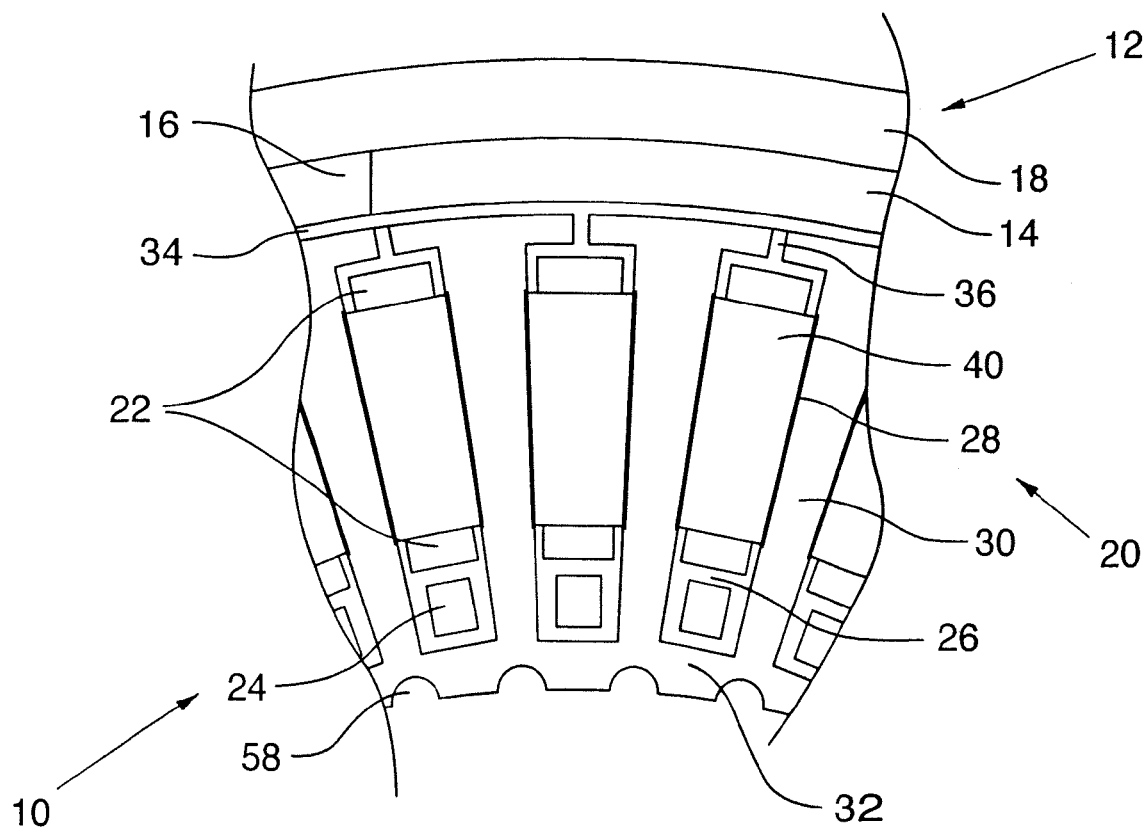
FIG. 6f is a cross-sectional view along the lines 6f-6f in FIG. 6e.

Referring to FIG. 6a, in this embodiment three primary windings 22a are provided, namely primary windings $22a^1$, $22a^2$ and $22a^3$, to provide the desired 3-phase configuration. Each primary winding 22a is provided with its own primary terminal 50a (see FIG. 6b) for ease of connection to an associated primary circuit (not shown). Secondary windings 24a and 24b each have squirrel cage-type arrangement (i.e. with legs 42 and end rings 44) and have secondary terminals 52a and 5b, respectively, for ease of connection to an associated secondary circuit. Referring to FIGS. 6d and 6e, preferably (as will be described in greater detail below) each leg 42 of secondary windings 24 includes a current-limiting device such as a fuse or breaker element 54. Stator 20 has a plurality of passages 58 defined on its inner periphery to act as an oil transfer mechanism, as will also be described in more detail below. Referring again to FIG. 6a, preferably paper spacers 56 are placed between primary windings 22 and stator 20, and between secondary winding 24 and stator 20, for insulation purposes.

Bridges 40 are preferably non-integral with stator 20, and thus inserted as an assembly as depicted schematically in FIG. 6c, which advantageously permits the designer to select different materials for bridge 40 and stator 20. For example, a bridge material may be chosen to alter the magnetic or performance characteristics of machine 10, as will be discussed in greater detail below. Non-integral bridges 40 may also beneficially facilitate machine assembly, as explained further below.

Referring in particular to FIGS. 6a-6c, as mentioned this embodiment has a "multi-channel" architecture, in that a plurality of fully independent "sets" of primary and secondary windings are provided. In this case, two such sets are provided (i.e. sets "a" and "b" described briefly above), namely primary windings 22a and 22b (primary winding 22b is not shown, for clarity) and secondary windings 24a and 22b. This multi-channel architecture permits a plurality of motor/alternators to exist within the same stator, and which may either be operated conjunctively, or independently, as desired. For example, in normal machine operation, the outputs of the winding sets may be combined to provide a single output, but in the event of a fault which requires one winding set to be shut down, the remaining winding set(s) may continue operation unaffected. This feature thus permits more than one motor/generator to exist within the same machine (as is discussed in greater detail below), thereby providing redundancy which may very valuable in applications where a complete shutdown would be catastrophic.

Stator 20 has a tooth gap 36 preferably provided in accordance with the applicant's co-pending application Ser. No. 10/393,252, filed Mar. 21, 2003, the contents of which are incorporated into this disclosure by reference. Though not shown specifically in this disclosure, but as incorporated by reference from the applicant's said co-pending application, tooth gap 36 is not necessary in the stator face adjacent the rotor (i.e. near 28a, as in FIG. 4e), but rather slots 28 may open to the opposing face (i.e. the face opposing the stator's 'rotor face'—i.e. nearer to 28b in FIG. 4e) or slots 28 may have no such openings adjacent either 28a or 28b, but rather having openings only at faces 27 and 29.

Figure 7A:
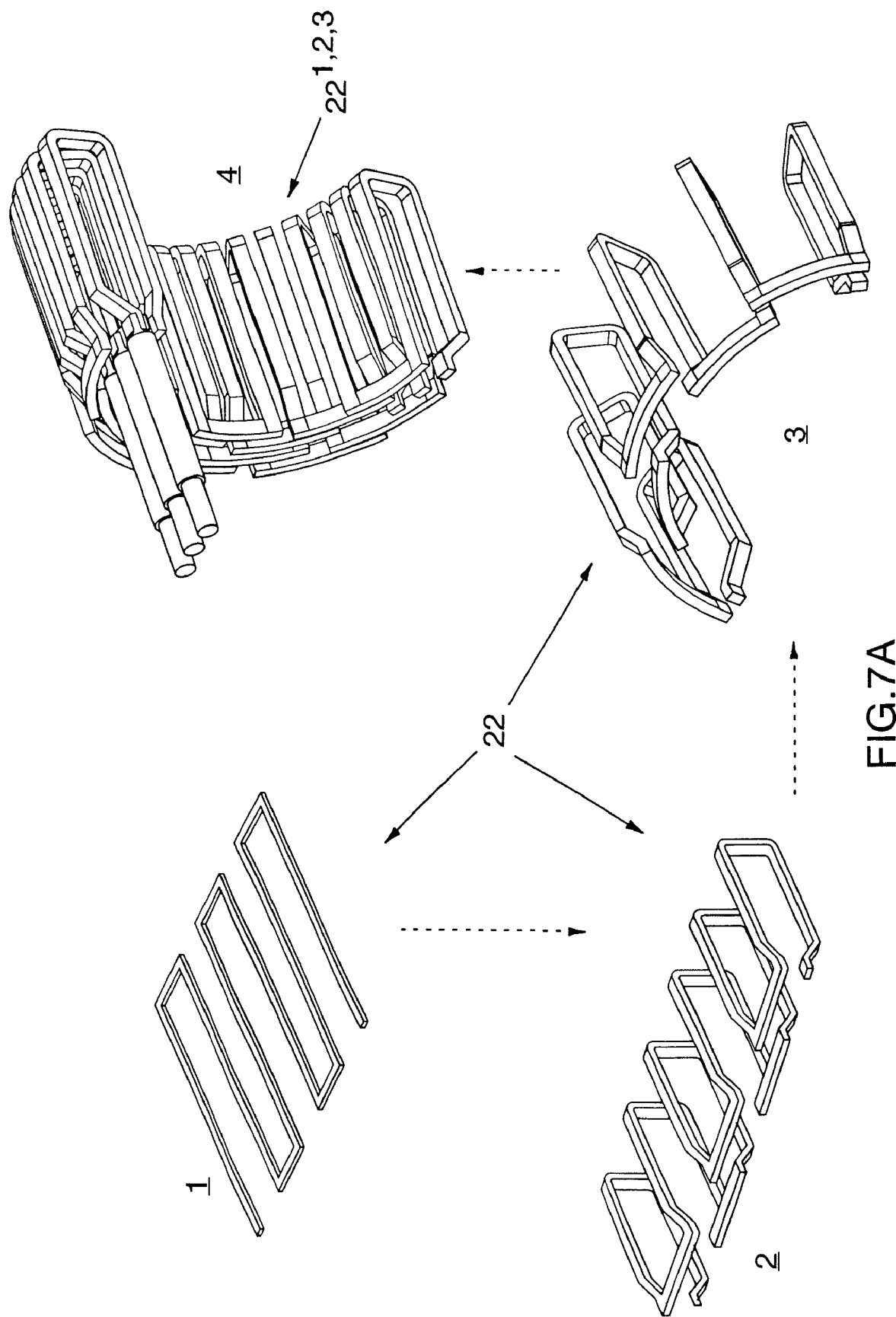
FIG. 7a is an isometric schematic representation of a method for making primary windings in accordance with the present invention.
Figure 7B:
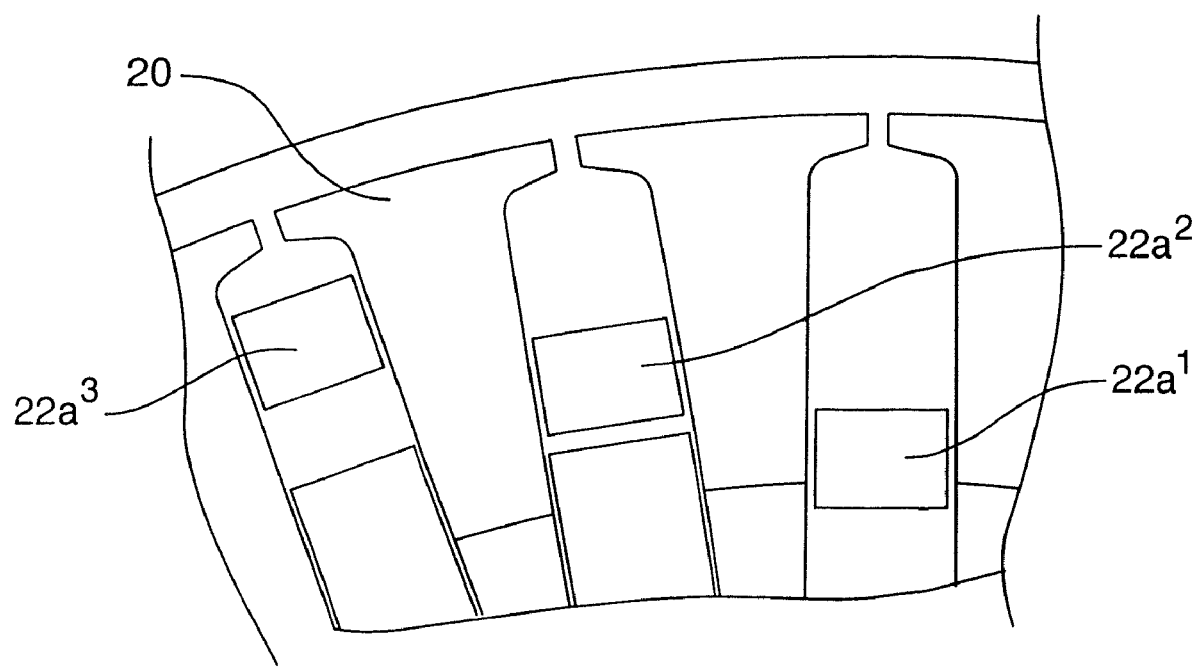

Primary windings 22 and secondary winding 24 are preferably each composed of single conductor provided in a single turn configuration. This single conductor, single turn configuration is preferred because it reduces the probability of a short circuit within the winding. Primary windings 22 are preferably stamped or otherwise provided from sheet metal and then pre-bent into a desired shape prior to insertion into the stator. An example series of fabrication steps are shown schematically in FIG. 7a. Advantageously, bridge 40 may be inserted into the windings before insertion into the stator, and this removable bridge portion and stator architecture permits the windings to be completely pre-assembled before being inserted into the stator, thereby improving manufacturability. Referring to FIG. 7b, primary windings 22 are also preferably installed in stator 20 such that they are individually radially separated from one another to provide increased anti-short circuit protection between adjacent windings.

Referring to FIGS. 6c and 6d, in this embodiment wherein bridges 40 are non-integral with stator 20, primary windings 22 may be "pre-wrapped" around bridges 40 prior to assembly into teeth 30 of stator 20. When a whole-number of turns around bridge 40 are made by primary winding 22 (in this case, one turn is made), primary winding 22 enters and exits slot 28 of stator 20 between from the same side, as described above. This design feature advantageously permits primary windings 22 to be pre-assembled with bridges 40 (and spacers 56, as desired) prior to insertion into slots 28 of stator 20. This permits traditional winding machines (and their associated manufacturing and tolerance difficulties) to be avoided altogether in the present design.

Figure 8A:
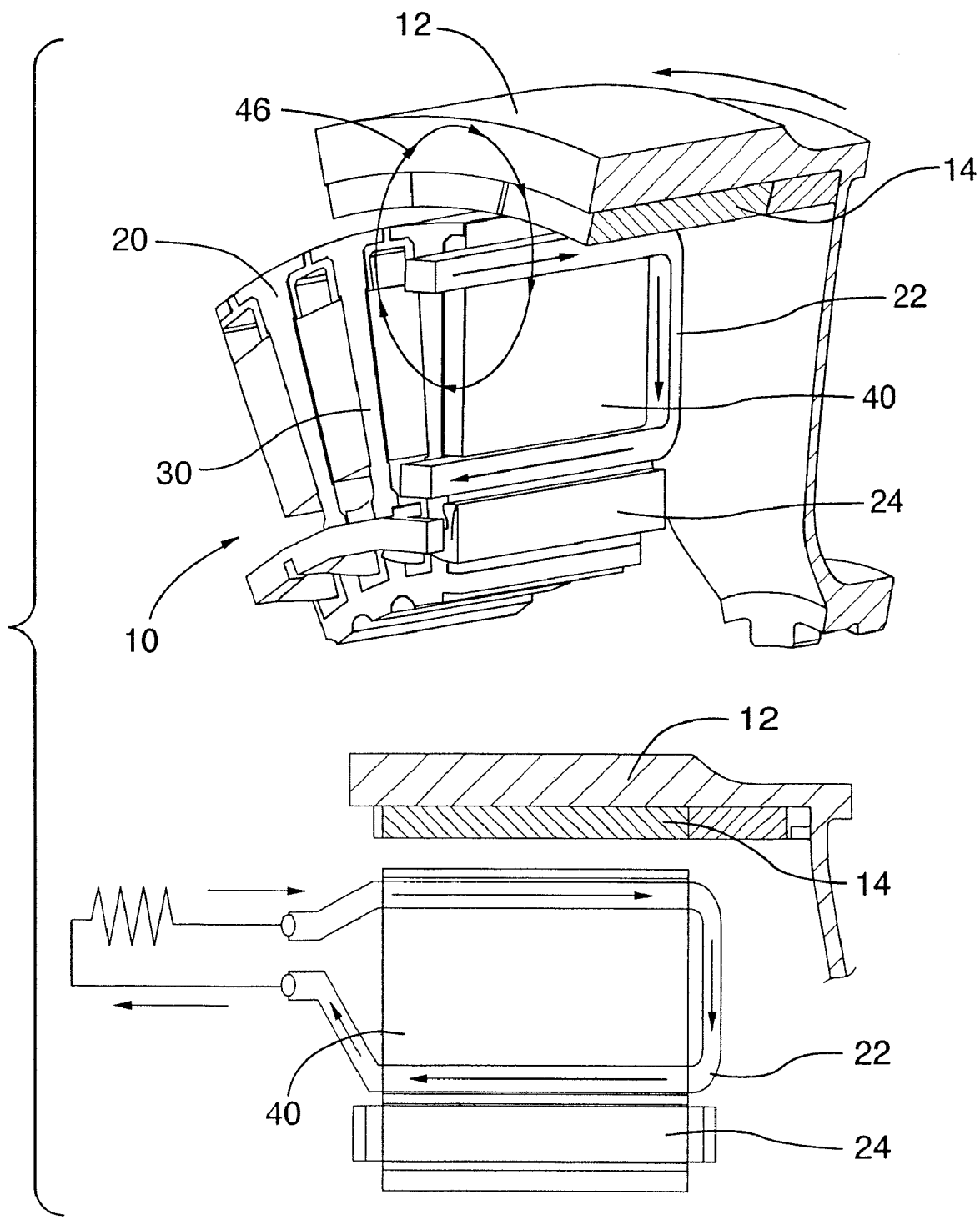
FIG. 8a is an enlarged isometric view and a cross-sectional view similar to FIGS. 6d and 6e, respectively, schematically representing electrical and magnetic activity on start up of the present invention.

Referring to FIG. 8a, in use, whether in a motor or alternator mode, the interaction of magnets and primary winding 22 causes a primary flux path 46 to be set up which runs down a first portion (i.e. the upper end) of tooth 30, across bridge 40, and back up a corresponding first portion of an adjacent tooth 30, and then to and through the rotor to complete the loop, as depicted by the solid arrows in FIG.

Figure 8B:
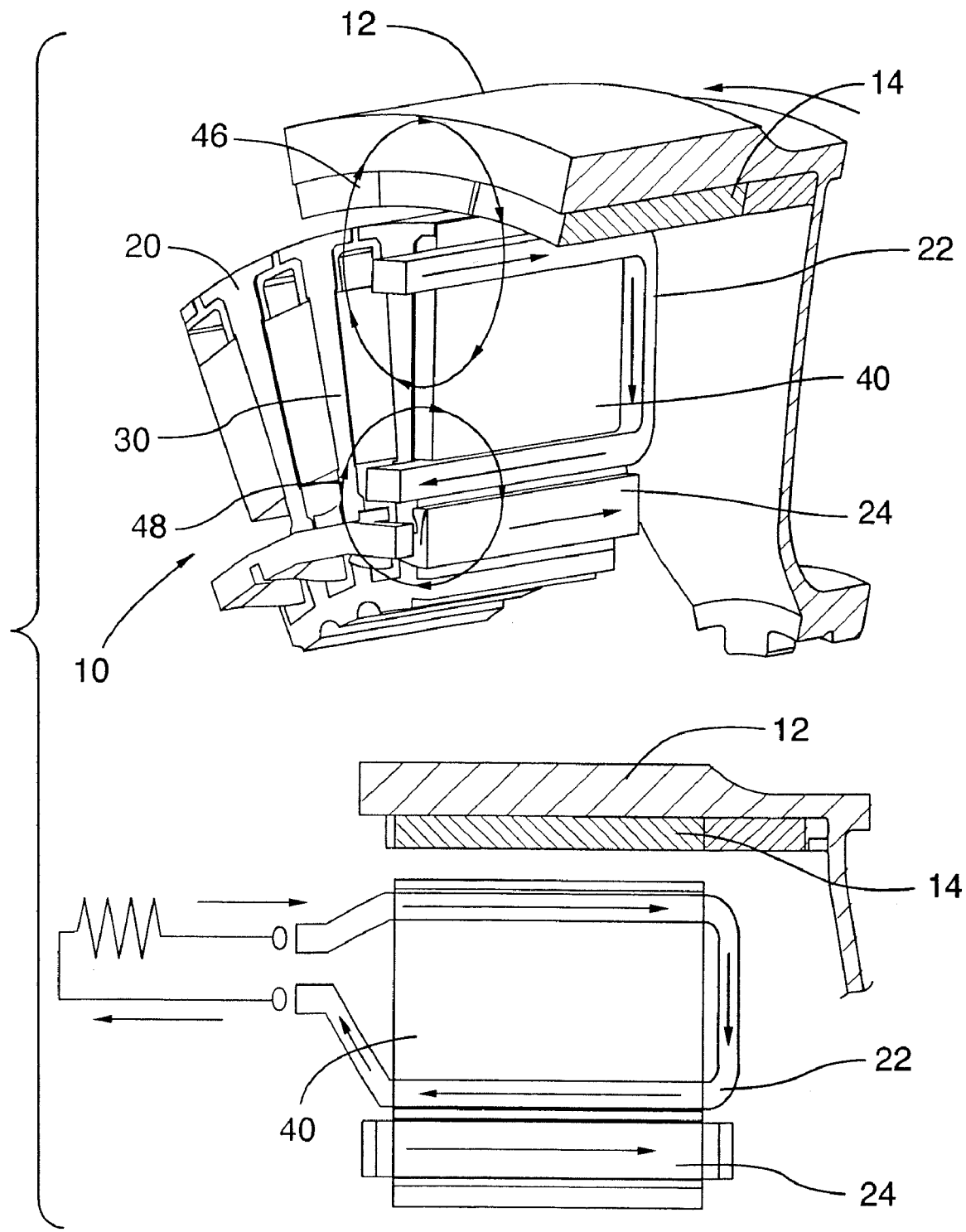

8a. This primary flux path causes (or is the result of, depending on whether PM machine is operated as a motor or an alternator) current to pass through primary winding 22 (in a closed primary circuit). Referring to FIG. 8b, this current flow through primary winding 22 causes a secondary flux path 48 to be set up through a second portion (i.e. the lower end) of teeth 30, through back iron 32, back up through the corresponding second portion of an adjacent tooth 30 and then back through bridge 40 to close the secondary loop. This secondary magnetic circuit causes a secondary current to flow through secondary winding 24 (in a closed secondary circuit)

The magnetic flux in secondary path 48 thus loops the portion of secondary winding 24 opposite primary flux path 46, and the interaction of primary winding 22 and secondary winding 24 thus sets up a secondary magnetic circuit in machine 10. It can clearly be seen, therefore, that the magnetic flux path(s) of the present invention are entirely different than is present in a typical prior art PM machine. As will be described in greater detail below, these characteristics of the present invention present many advantages to a PM machine designer.

When used as an alternator, a PM machine will generate voltage and current which may be used as required, or stored for later use. Often, a conditioning step of some description is required to convert the raw output of the alternator into a more useful form (typically by varying the voltage, current and/or frequency and perhaps also rectify the output into DC current). As discussed in the Background, in a gas turbine integral-starter generator (ISG) application, in normal operation in an alternator mode, variations in engine speed and load results in an ISG output current and voltage which requires conditioning before the generated electricity is useable by on-board aircraft systems such as electric oil pumps, fuel pumps and other accessories. Therefore, means may be provided outside PM machine 10 to control and condition the machine output (i.e. preferably the output of primary winding 22).

However, when operated as an alternator, the present invention also permits the output the primary winding(s) 22 to be controlled to a certain extent through a manipulation of at least the current secondary winding(s) 24, as will now be described.

Figure 9:
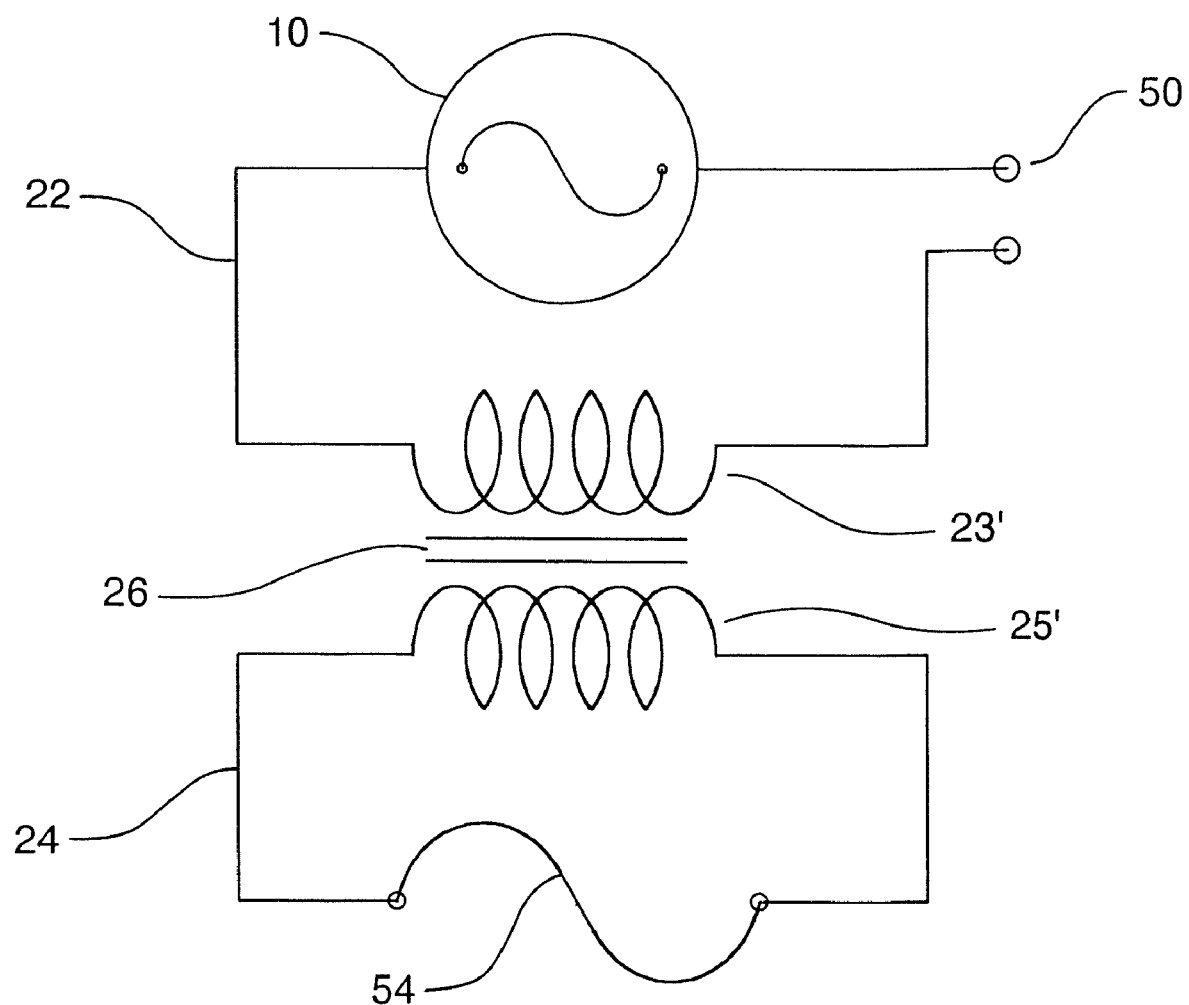

Referring again to FIGS. 8a and 8b, it will be appreciated that, in essence, the present invention set ups a transformer-type relationship between primary winding 22 and secondary winding 24, as is schematically represented FIG. 9 by an simple equivalent circuit. In the preferred embodiments depicted in FIGS. 4a to 6f, the equivalent "transformer" is a 1:1 transformer, i.e. the number of turns in primary winding 22 equals the number of turns in secondary winding 24 (here, each has only one turn). In such a "transformer", the following relationship exists between the primary and secondary windings:

$$I_{PRIMARY} * V_{PRIMARY} = I_{SECONDARY} * V_{SECONDARY}$$

Thus, the magnetic flux developed within secondary magnetic circuit is proportional to the current flow in primary winding(s) 22 and inversely proportional to the magnetic coupling within secondary magnetic circuit. The magnetic flux in secondary magnetic circuit is proportional to the magnetic coupling, and inversely proportional to the current flow in secondary winding 24 (i.e. the current induced in the secondary winding causes the secondary flux to be cancelled). Therefore, the current flowing in secondary winding 24 directly influences the current generated in the primary winding 22 by the rotating magnetic system of PM machine 10, and the current flow is a function of the current flow in the primary windings. The secondary windings 24 are inductively coupled only to the primary winding 24 (excluding leakage, etc.), and thus the secondary winding 24 and secondary magnetic circuit 48 are only influenced by the flux in the primary magnetic circuit 46 set up by the primary winding 24 (except in the case of a low Curie point bridge, of the type describe further below, when the bridge is at or exceeds the bridge material's Curie point temperature).

This aspect of the present invention permits the designer to use the secondary winding to manipulate the output of primary winding 22, and thus secondary winding 24 may be used as a source of control PM machine 10. Means for controlling the operation of PM machine are thus available within the machine itself, as the "control" current may be generated within PM machine 10, that is in secondary winding 24. In some instances, therefore, no external source of control current may be required. The novel architecture of the present invention therefore lends itself to many novel possibilities for control systems for the machine, a few examples of which will now described.

In one example control scheme, the output (i.e. from a primary winding 22) of PM machine 10 in an alternator mode may be controlled by mechanical means by directly influencing the current in the secondary winding 24. Referring again to FIGS. 6d and 6e, a current limiting device 54, such as a fuse element, is preferably provided in one or more legs 42 (preferably all legs) of secondary winding 24. Referring to FIGS. 8a and 8b, as mentioned, current in secondary winding 24 is a function of current in the primary winding 22. Thus, as current in the primary winding rises (such as in the case of an internal fault such as a short circuit) so, too, will the current in the secondary winding. Referring to FIG. 12b, in use, when the current in secondary winding 24 exceeds a certain threshold, a fuse element 54 would "blow", thereby creating an open-circuit in secondary winding (i.e. no secondary current) and, by reason of the electrical inter-relationship between the primary and secondary circuits, the output current of primary circuit will be limited. With no current flow in the secondary winding, the flux in primary magnetic circuit 46 induces in a significant flux in secondary magnetic circuit 48. Consequently inductive reactance is increased, which can be used limit maximum output current to a maximum synchronous impedance of machine 10. (Prior to opening of the fuse, when secondary current is allowed to flow in the secondary winding, the resulting secondary flux is in the opposing direction and thus tends to cancel the secondary flux. Hence, the operation of machine 10 is relatively unaffected by the presence of the secondary until the secondary circuit opens.) This permits the control of the machine's impedance and offers PM machine 10 intrinsic thermal protection against a short-circuit in primary winding 22 when operating in an alternator mode. Any suitable fuse may be used.

Prior to opening of fuse 54 (i.e. in normal machine operation), secondary winding 24 as disclosed in the embodiment of FIGS. 6a-6f operates in a simple short-circuited squirrel cage arrangement, and thus will have no perceptible effect on primary winding 22. In other words, when secondary winding 24 is fully short circuited, PM machine 10 may be operated in a manner substantially in similar to prior art machines.

In a second example control scheme, current in the secondary winding 24 can be influenced by electronic means to control the current in primary winding 22. Direct electronic control of current in secondary winding 24 can be achieved by an impedance or other control system, such as the examples depicted in FIGS. 10, 11a and 11b which provide proportional type or other control adjustments of the current in secondary winding 24, to thereby control the current in primary winding 22.

Figure 10:
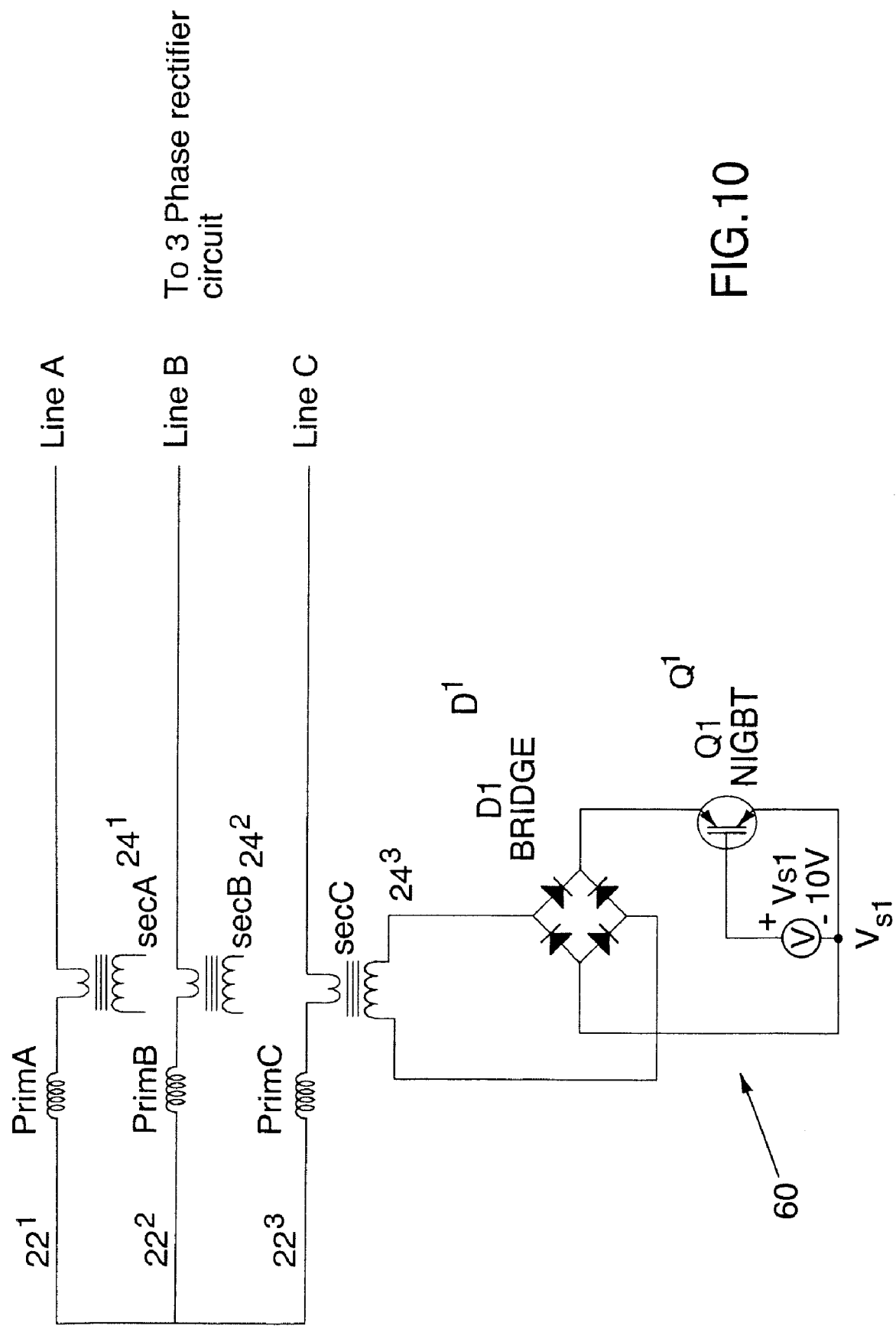
FIG. 10 is a schematic of an embodiment of a secondary winding control circuit.
Figure 11A:
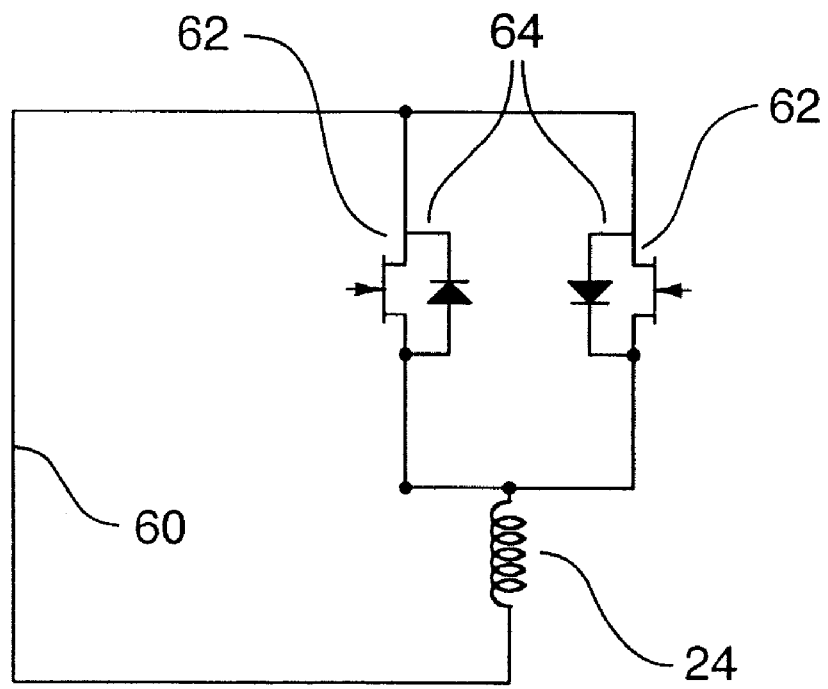
FIG. 11a and 11b are schematics of other examples of secondary winding control circuits.

FIG. 10 shows an example of a simple arrangement for solid state secondary winding electronic control circuit 60 for control secondary winding 24 for machine 10. The main elements are $D_1$ Bridge rectifier, and $Q_1$ IGBT device (Insulated Gate Bipolar Transistor). The device $Q_1$ could also be substituted by another type of device, such as a power MOSFET or other switching device. In this example, multiple secondary windings $24^1$, $24^2$, $24^3$ (e.g. as in the example of a multiphase machine having a secondary winding for each phase) preferably each have similar circuits, e.g. as 60 is depicted in FIG. 10, which could be controlled by a single control system. $V_{s1}$, the control voltage, is used to switch $Q_1$ 'on' or 'off' and, as such, may be used to control the average DC current flow in the $D_1$ rectifier bridge and, consequently, the AC current flow in secondary winding 24. In this arrangement, secondary winding 24 preferably has multiple turns (relative to primary winding 22) such that the current being switched by the $Q_1$ device would be stepped-down to only a fraction of the current flow in primary main winding 22 to thereby permit low current control circuitry connected to secondary winding 24 to control a high current machine output from primary winding 22. (The switched voltage at $Q_1$ would generally still be higher than the primary machine voltage, but it will be understood that this is still practical since $Q_1$ devices are available which operate at over 1500V). This control arrangement is useful as a voltage regulator when the output of machine 10 (i.e. the output of primary winding 22) is to be rectified for use as a DC supply or further conditioned as desired. In use, the current induced in the secondary is affected and controlled by the elements in the secondary circuit, and this control permits the current and/or voltage of the primary to be affected as desired to control the operation and behaviour of PM machine 10.

Figure 11B:
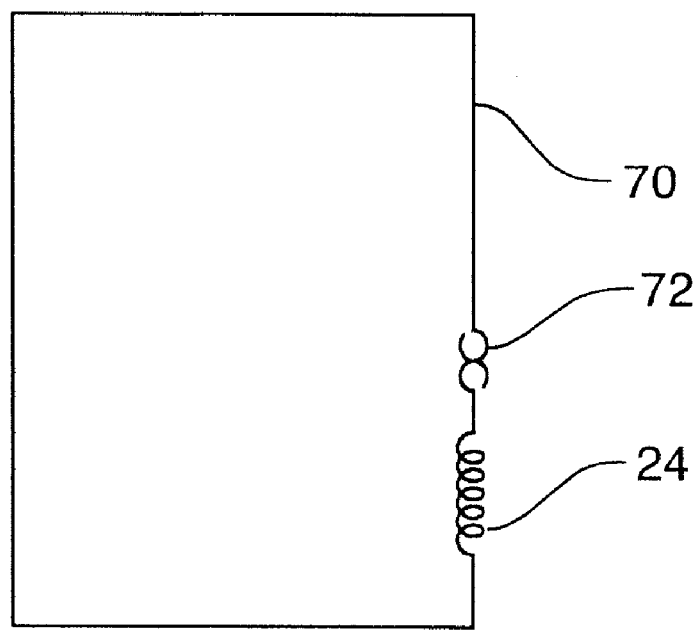

Many other control schemes are also possible. Referring FIG. 11a, a different secondary winding electronic control circuit 60 is shown, in which the output of secondary winding 24 fed in parallel through parallel diode 62 and transistor 64 pairs (in this case the transistors are NJFETs) to permit the secondary current to be modulated to thus control the primary winding 22 output. Referring to FIG. 11b, a second embodiment of a secondary winding control circuit 70 is shown, in which the output of secondary winding 24 fed to a thermally-sensitive switch 72. Still other control schemes are possible, as will be appreciated by one skilled in the art upon consideration of this disclosure.

In a third example control scheme, the current in secondary winding 24 can be influenced by varying the magnetic coupling in the secondary magnetic circuit to thereby control the primary winding current. For example, referring again to the figures the configuration and material selection for components such as stator teeth 30, back iron 32 and bridge 40 will also vary the magnetic properties of the secondary magnetic circuit, thus permitting the designer to "control" the performance of PM machine 10. In one example, described further below, the secondary magnetic circuit includes a low Curie point material such as ferrite, when the machine operates with the secondary magnetic circuit at or above the Curie temperature the effect or influence of the secondary winding would be greatly reduced.

As discussed above, non-integral bridge pieces 40 may provide benefits for the assembly of PM machine 10. Also, as briefly mentioned, the provision of a non-integral bridge permits the designer to select a different material for bridge 40. For example, additional short-circuit control can be provided to PM machine 10 in accordance with the teachings of the applicant's U.S. Pat. No. 6,313,560 (the '560 patent), the contents of which are incorporated by reference into this disclosure. The '560 patent teaches that materials with a low Curie temperature (referred to as low Curie point materials in this description), such as ferrite, can be beneficially used in electric machines to provide thermal protection in the event that a fault causes normal operating temperatures to be exceeded. This concept may also be applied in the present invention, as will now be described.

Referring again to FIGS. 6a-6f, preferably bridges 40 are made of different material than teeth 30, which thereby permits the designer to alter the behaviour of the primary and secondary magnetic circuits. Most preferably, bridge 40 is made of a low Curie point material of the type described in the '560 patent, such as ferrite.

Figure 12A:
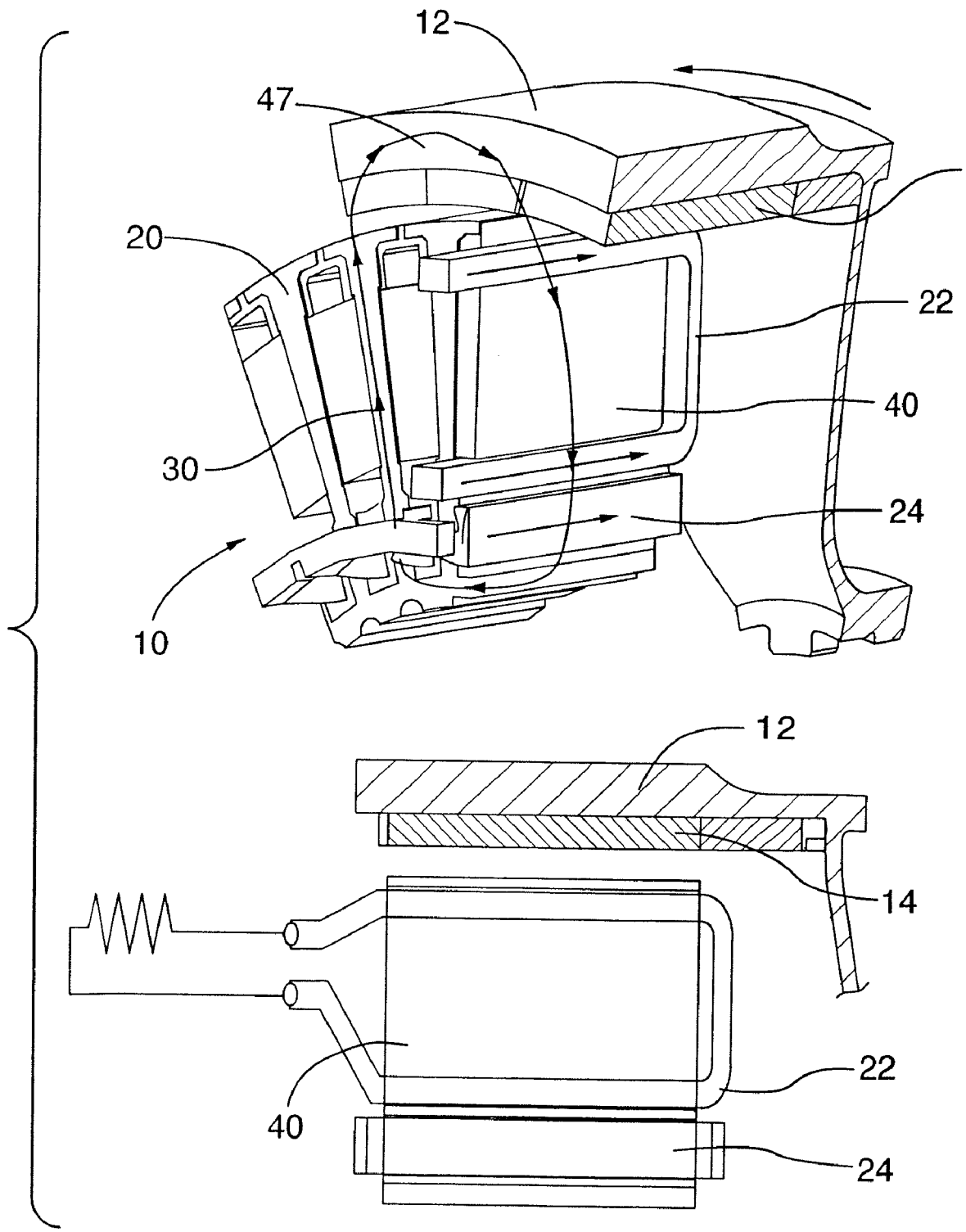
FIG. 12a is an enlarged isometric view and a cross-sectional view similar to FIGS. 6d and 6e, respectively, schematically representing electrical and magnetic activity of another embodiment of the present invention employing a low Curie point material.
Figure 12B:
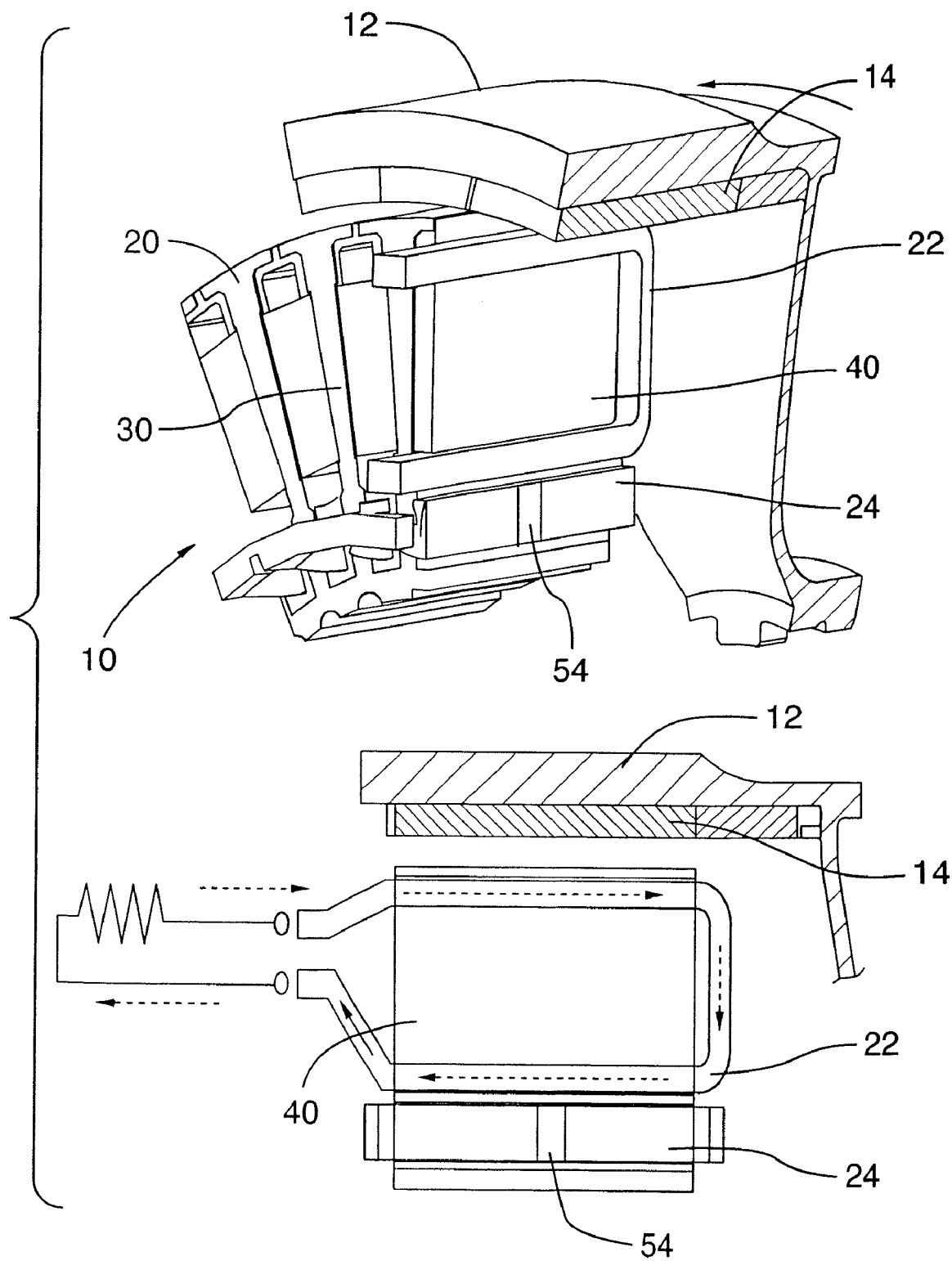
FIG. 12b is an enlarged isometric view and a cross-sectional view similar to FIGS. 6d and 6e, respectively, schematically representing electrical and magnetic activity after the secondary winding fuse of the present invention blows.

Referring now to FIG. 12a, in use, in such a thermally-protected embodiment primary winding 22 is preferably closely thermally coupled to bridge 40 pieces to permit a fast and effective control of the machine in the fault condition. In the event of a fault that raises the temperature of a bridge 40 to or above the Curie point of the ferrite bridge material, bridge 40 begins to lose its ability to conduct magnetic flux, and thus (eventually, as temperature increases) becomes "invisible" to the magnetic circuit in stator 30. The primary and secondary magnet circuits are thus joined into one circuit (reference 47), as magnetic flux (eventually) no longer crosses bridge 40, or flux is at least greatly reduced.

In fact, preferably, the low Curie point material is selected such that when the Curie point of bridge 40 is reached, bridge 40 doesn't completely stop magnetic flux from passing therethrough (and thus doesn't completely "shut down" the primary current down, but rather as the Curie point is reached and exceeded, the amount of magnet flux passing though the bridge is progressively reduced, thereby acting just to "turn down" the primary current, rather than shut it off completely. The amount the current is "turned down" by bridge 40 is controlled by the amount of magnetic "short circuit" experienced as a result of reaching the bridge material Curie temperature, and is thus affected not only by bridge 40 material, but also by (a) tooth pitch, (b) back iron thickness, (c) tooth length, and (d) back iron material, among other things. The designer may use this knowledge to control the "turn down" behaviour of PM machine 10 in the event a machine fault occurs.

To enhance the effectiveness of a low Curie point embodiment of the present invention, a close thermal coupling between the windings and the low Curie point material of bridge 40 is advantageous and thus preferred. This close coupling may be achieved by close contact between primary winding 22 and bridge 40, and/or may be enhanced by the use of bonding material between the windings and the low Curie point material.

Advantageously, the use of a low Curie point bridge material can provide thermal protection to PM machine 10 in fault situations where the current in secondary winding 24 is not high enough, for example, to blow a fuse 54 and yet continued operation of machine 10 could result in damage to the machine. Thus, the use of a low Curie point material in conjunction with the present invention can permit intrinsically redundant safety systems to be incorporated.

Another significant advantage of PM machine 10 is that, when a low Curie point material is employed as described, if the internal fault is a short in a loop (or loops) of the winding, the described low Curie point embodiment can permit only the faulty loop(s) to be shut down or turned down, leaving the operation of the rest of the winding essentially unaffected. The bridge and stator arrangement, in conjunction with the independent ferrite bridge portions, in effect forms a plurality of serially-connected by otherwise independent alternators within PM machine 10.

A low Curie point material may also be used in the secondary circuit for control purposes. For example, if a low Curie point material (such as ferrite) were used in the secondary magnetic circuit of the present invention, for example in the back iron, the design could permit the current in the primary circuit to be increased as the low Curie point material in the secondary circuit is heated above its Curie temperature. This may be a beneficial feature, depending on the performance criteria or specification for a particular application for PM machine 10. For example, this feature may be used to increase output to a cooling system such that the machine, operated as an alternator, both provides cooling power and controls temperature.

Figure 13B:
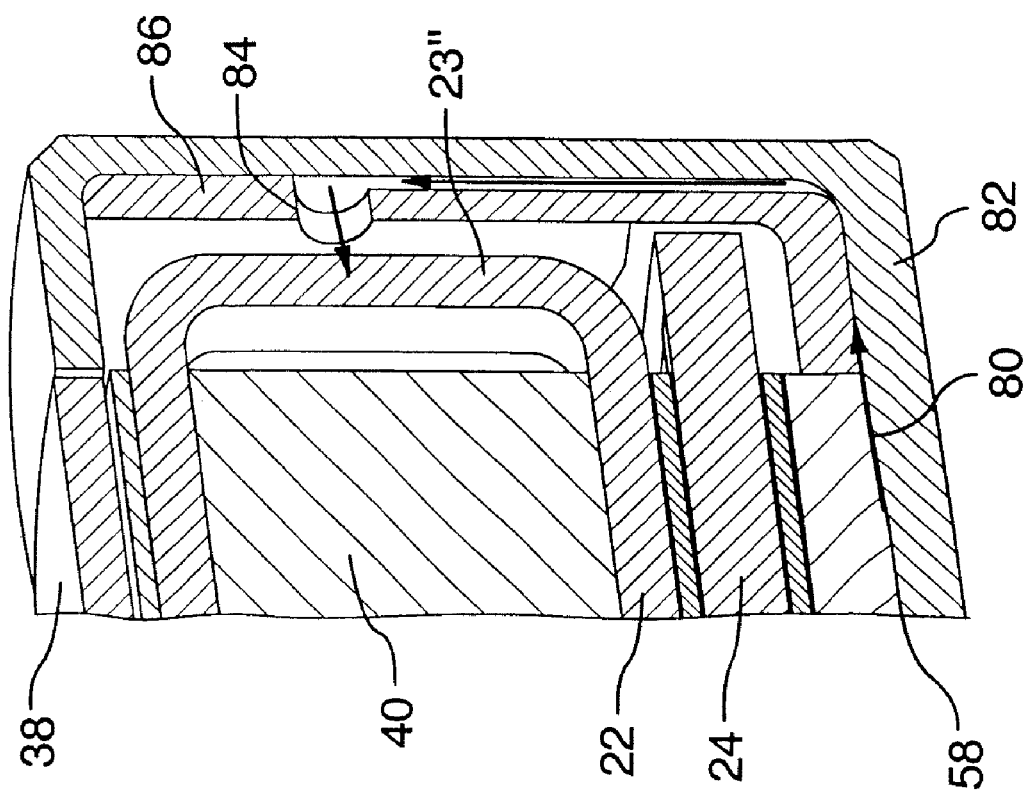
Figure 13A:
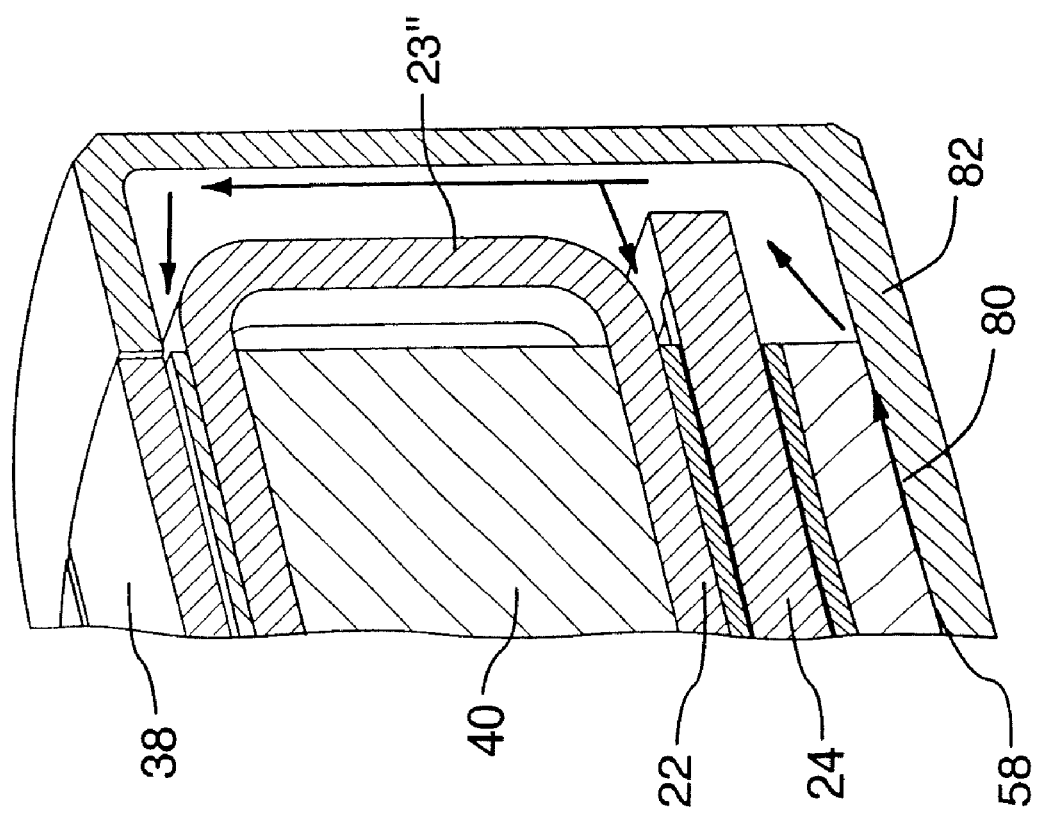
FIG. 13a is an enlarged isometric cross-sectional view of a portion of the stator of another embodiment of the present invention.

Referring to FIGS. 13a and 13b, the present invention may be provided including a cooling system including a coolant 80 (preferably oil) within PM machine 10. Oil is circulated through passages 58 inside a stator jacket 82 around and along the primary and secondary windings to assist in cooling them. In FIG. 13b, an oil jet 84 in an insert 86 directs oil onto the end turn of the primary winding. If the insert 86 is made of aluminum or copper, the stray inductance of the end turn is also reduced, thereby reducing the overall machine impedance.

Accordingly, control schemes such as those disclosed above may be employed individually or may be combined as desired to permit several control features to exist contemporaneously within the PM machine. As prior art fixed-geometry PM machines typically are not controllable in any way other than by the speed at which they are operated, this controllability feature of the present invention is of significant value to the PM machine designer, particularly in those applications where the rotational speed of the machine cannot itself be used to control machine output. The present invention also offers a robust and reliable design suitable for aerospace applications.

In essence, the present invention provides a type of internal current-limiting transformer (in the described embodiments, a 1:1 transformer, but other ratios are possible) built into the magnetic structure of the machine. The "primary" is connected electrically in series with the main output feeders of the alternator, and the "secondary" is configured preferably as a short circuit, which will become an open circuit, by means of a fuse, or other circuit interrupting or current limiting means, above a certain pre-selected temperature. Typically, the pre-selected threshold temperature will be the maximum safe sustained operating temperature of the machine, above which the machine is susceptible to thermal damage (e.g., say about 300° C. when typical electric machine construction materials are used). When the secondary becomes open circuit, current flow in the primary is significantly reduced as a result of the inductive reactance of the "transformer" under no load conditions, which thereby results in an increase in the machine impedance. Preferably, the increase in machine impedance is a significant one (e.g. doubling the machine impedance), such that the short circuit current in the primary is effectively limited to a value equal to the maximum power rating of the machine. The advantage of using this "transformer" type arrangement is that each stator slot may be protected by its own "transformer-breaker", and thus the voltage that is being fused is only a fraction (e.g. $\frac{1}{6}^{th}$ in a dual-channel 3 phase machine of the type described further below) of the total generated voltage. Consequently, the breaker/fuse in the secondary will be less likely to experience an arc when the circuit is opened.

The 'transformer' of the present invention may also be remote from the stator, such that a portion of the primary and some or all of the secondary are disposed external to the stator.

The net effect of the low Curie point embodiment described above is that two thermal protection schemes may be implemented in the machine, namely (1) a low Curie point type over-temperature protection scheme, which provides intrinsic and automatic reversible (i.e. non-permanent) overload protection to prevent permanent damage to the machine for moderate to severe temperature overloads, and (2) a high temperature protection scheme which will automatically react in the event that (i) the first-mentioned mechanism does not sufficiently control the short circuit current within the time desired, and/or (ii) in situations where the short circuit resistance(s) in the machine is (are) very low.

Figure 14:
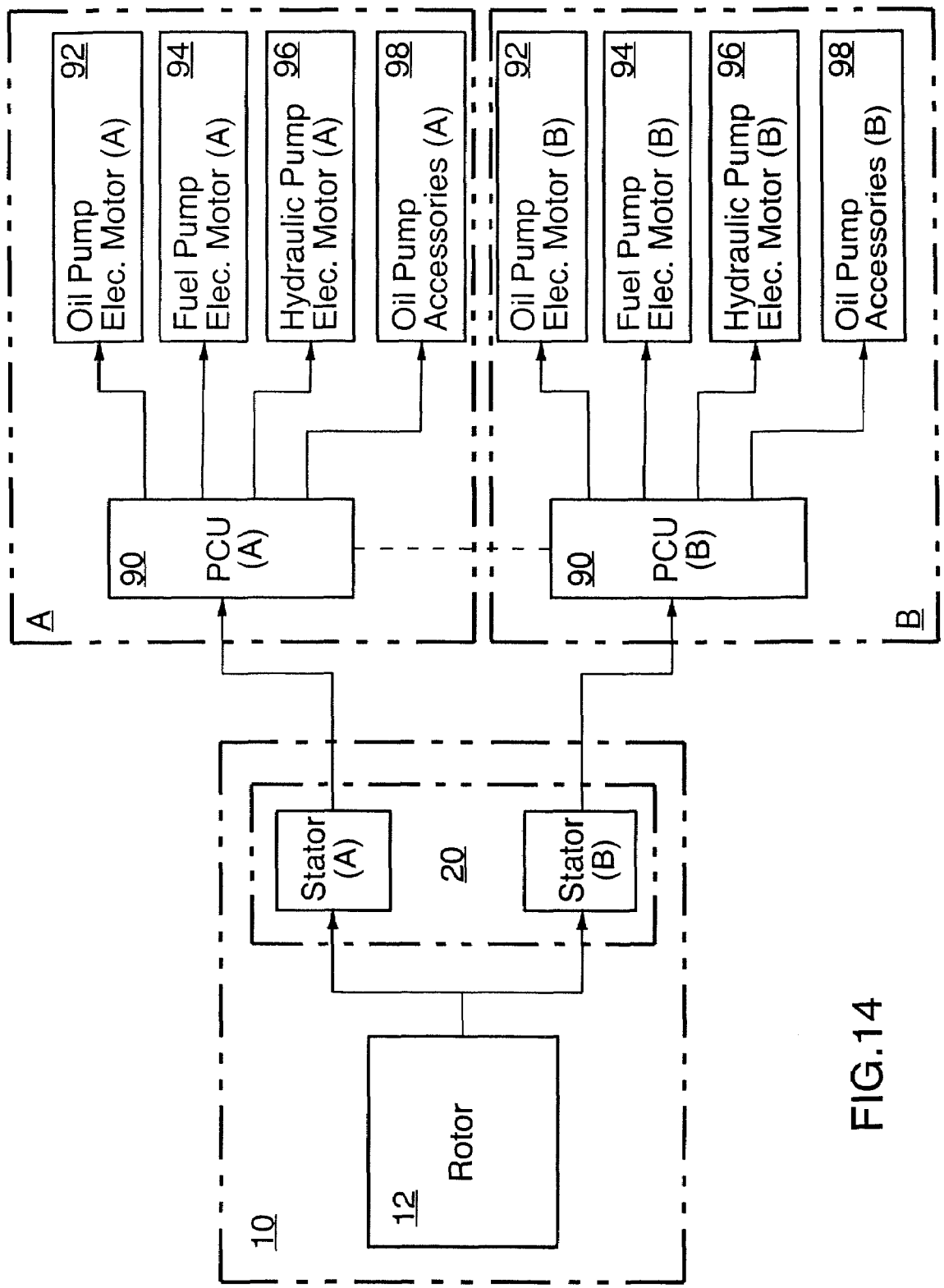
FIG. 14 is a schematic of an aircraft accessory system employing a multi-channel version of the present invention.

As discussed above, the present invention also includes a "multi-channel" design which can, among other things, offer inherent redundancy useful in aerospace applications. Referring to FIG. 14, a PM machine 10 of the type described with reference to FIGS. 6a-6f above in essence provides a single rotor rotating relative to multiple (in the described case, two) independent stators. Thus, rotor 12 rotates relative to a "virtual" stator 20a (the portion with primary windings 22a) and also relative to a "virtual" stator 20b (the portion with primary windings 22b). This, PM machine is "two-in-one machine in this case. The output of these two "machines" may then be combined, which permits the option of operating the "two machines" as one. PM machine 10 is then preferably connected to fully redundant accessory systems, which may include redundant power conditioning units (PCU) 90, oil pumps 92, fuel pumps 94, hydraulic pumps 96 and other electrically-run accessories 98. In an gas turbine ISG application, this dual- or multi-channel design permits a fully redundant system (system A+system B, in FIG. 14) to provided with a minimum of hardware, thereby minimizing weight and space and increasing reliability. As well, since generator efficiency is proportional to $I^2$ losses, it is often preferable to run two "machines" like this, each at ½ of the output current, rather than one machine a full output current. Further, power from the two "machines" may be shared, if desired, between the PCUs with the appropriate connections, etc., to permit redundancy in the case of a "machine" or PCU failure.

Figure 15:
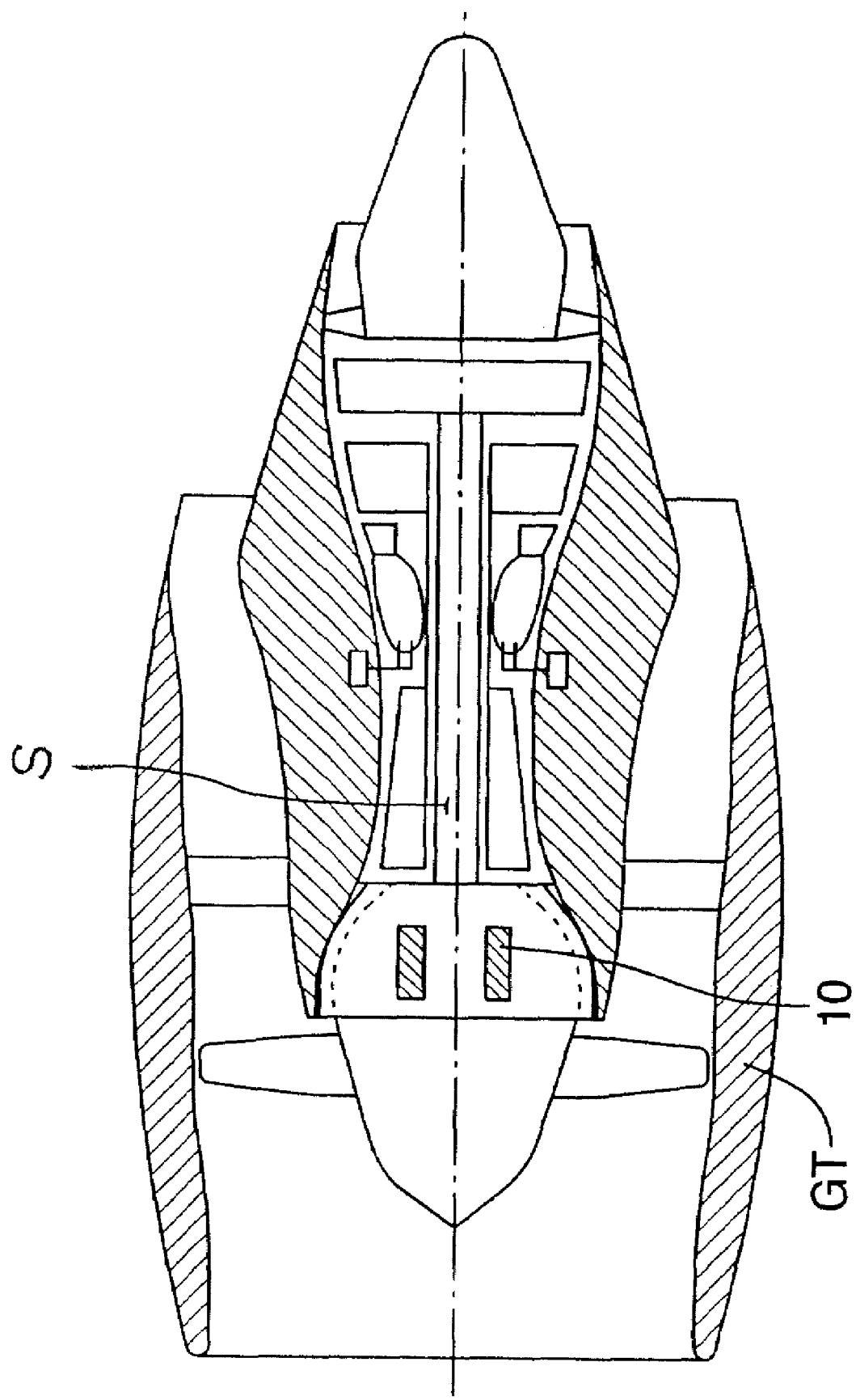
FIG. 15 shows a gas turbine engine incorporating the present invention, with a portion of the engine broken away to reveal a cross-section thereof.

The present invention is particularly well suited, among other things, to prevent overheating problems of an internally short circuited permanent magnet arrangement that is driven continuously, such as in the case of an internal fault in a machine 10 driven by a shaft 'S' in gas turbine engine 'GT', as depicted in FIG. 15. The invention also permits a certain level of control to be attained over an alternator which is driven at variable speeds (i.e. driven by an operating propulsive aircraft gas turbine).

The above description is meant to be exemplary only, and one skilled in the art will recognize and changes may be made to the embodiments described without departing from the scope of the invention disclosed. For example, the machine may be single or multi-phase, single or multi-channel. The windings may have single or multi turns per slot, the number of turns of primary windings does not have to equal the number of turns of secondary winding, the number of turns of a winding not necessarily have to be a whole number, the number of primary windings does not have to equal the number of secondary windings, as one or more windings in a slot may perhaps be present in a slot. A variety of winding types may be used (squirrel cage, lap, etc.), and the windings may be any conductor(s) (i.e. single conductor, more than one wire, insulated, laminated, etc.) or may be superconductors. In multiphase machine, there may be zigzag, delta, or Y-connected windings in accordance with known techniques. There need not be an air gap between the primary and secondary winding, as long as the windings are electrically isolated from one another.

The rotor can be electromagnetic (i.e. permanent magnet not necessary), and may be provided in an outside or inside configuration, or any other suitable configuration. The bridge may be provided in one or more slots, and may be integral or non-integral with the rest of the stator. A secondary bridge may also be provided, in the form of the back iron, for example, if the secondary winding(s) are wound around the back iron. Other secondary bridge configurations are also possible.

Secondary winding may also be used for control purposes in motor mode. Other portions of the stator and rotor, such as back iron for example, may be provided of a low Curie point material to achieve the benefits of the present invention. Still other modifications which fall within the scope of the present invention will be apparent to those skilled in the art, in light of a review of this disclosure, and such modifications are intended to fall within the equivalents accorded to the appended claims. In this application, it is to be understood that the term 'alternator' is used generically to mean a device used for creating electricity, and is not intended therefore to be limited to a device for generating an output alternating current.

What is claimed is:

1. An alternator comprising a rotor; a stator; at least one stator winding for providing an alternating current to a load electrical circuit, the stator winding having a plurality of serially-connected first and second portions, the first portions spaced apart circumferentially from one another relative to the stator; a control electrical circuit including at least one control winding and a control apparatus for controlling current flow through the control winding, the control winding having a plurality of legs, one of said legs disposed adjacent to each second portion of the stator winding; a plurality of rotor magnetic flux paths defined co-operatively by the rotor and stator for conducting rotor magnetic flux around the plurality of first portions of the stator winding; and a plurality of secondary magnetic flux paths for conducting secondary magnetic flux induced by current flow through the stator winding, the secondary magnetic flux paths defined around the stator winding second portions and adjacent control winding legs, the secondary magnetic flux paths being isolated from the rotor and the rotor magnetic flux paths.

2. The alternator of claim 1, wherein the stator winding second portions and the control winding legs are disposed within the stator.

3. The alternator of claim 2, wherein each rotor magnetic flux path passes through a portion of the stator shared with one of the secondary magnetic flux paths.

4. The alternator of claim 3, wherein said stator common portion comprises a material having a Curie temperature lower than a maximum permissible operating temperature of the alternator.

5. The alternator of claim 2, wherein said control winding legs are connected in parallel to one another.

6. The alternator of claim 2, wherein the control winding legs are connected in series with one another.

7. The alternator of claim 2, wherein the control apparatus includes at least one fuse for open-circuiting the control winding when a threshold current is exceeded in the control winding, wherein the threshold current in the control winding corresponds to a maximum desired output current in the stator winding.

8. The alternator of claim 7, wherein each rotor magnetic flux path passes through a portion of the stator shared with one of the secondary magnetic flux paths, and wherein the control apparatus includes said shared portion having a material with a Curie temperature lower than a maximum desired operating temperature of the alternator.

9. The alternator of claim 2, wherein the control circuit includes a solid-state circuit operated to control an average current flow in the control winding.

10. The alternator of claim 9, wherein each control winding leg comprises multiple turns relative to a number of turns of the adjacent stator winding second portion.

11. The alternator of claim 2, wherein a portion of the secondary magnetic flux paths remote from the rotor magnetic flux paths passes through a material having a Curie temperature lower than a maximum permissible operating temperature of the alternator, and wherein said Curie temperature corresponds to a machine temperature above which additional output power is supplied by the at least one stator winding to a load electrical circuit.

12. The alternator of claim 2, wherein the stator comprises at least two non-overlapping sectors, and wherein each sector includes at least one said stator winding, one of said control winding, a plurality of said rotor magnetic flux paths and a plurality of said secondary magnetic flux paths, and wherein the stator and control windings of each sector are operable independently of one another.

13. A gas turbine engine having an alternator according to claim 12, wherein the stator and control windings of each sector are connected to respective portions of a redundant gas turbine engine accessory system.

14. The gas turbine engine of claim 13, wherein at least one accessory of the accessory system comprises an electrical machine operable as a motor, the machine having the stator with non-overlapping stator sectors defined therein, each stator sector having stator windings operable independently of other stator windings of the machine, each sector driven by a corresponding sector of the alternator.

15. The alternator of claim 1, wherein said control winding legs are connected in parallel to one another.

16. The alternator of claim 1, wherein the control winding legs are connected in series with one another.

17. The alternator of claim 1, wherein the control apparatus includes at least one fuse for open-circuiting the control winding when a threshold current is exceeded, wherein the threshold current corresponds to a maximum desired output current in the stator winding.

18. The alternator of claim 1, wherein the control circuit includes a current source.

19. The alternator of claim 18, wherein the current source is independent of the stator winding.

20. The alternator of claim 1, wherein the control circuit includes a current source independent of the stator winding.

21. The alternator of claim 1, wherein a portion of the rotor magnetic flux paths passes through a material having a Curie temperature lower than a maximum permissible operating temperature of the alternator.

22. A gas turbine engine system comprising an electric machine operable at least as an alternator, the alternator having a stator with independently-controllable non-overlapping stator sectors defined therein, each stator sector having stator windings operable independently of other stator windings of the machine, each sector connected to a corresponding power conditioning system, the sectors connected in parallel to a gas turbine engine accessory system.

23. The gas turbine engine according to claim 22, wherein at least one accessory of the gas turbine engine accessory system comprises an electrical machine operable as a motor, the machine having its stator with independently-controllable non-overlapping stator sectors defined therein, each stator sector having stator windings operable independently of other stator windings of the machine, each sector driven by a corresponding sector of the alternator.

* * * * *